US012776339B2

(12) United States Patent
Poss et al.

(10) Patent No.: US 12,776,339 B2
(45) Date of Patent: Oct. 27, 2026

(54) LASER HEATER FEEDBACK CONTROL IN HEAT ASSISTED MAGNETIC RECORDING

(71) Applicant: Western Digital Technologies, Inc., San Jose, CA (US)

(72) Inventors: Joey M. Poss, Rochester, MN (US); Sukumar Rajauria, San Jose, CA (US); John T. Contreras, Palo Alto, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 19/090,327

(22) Filed: Mar. 25, 2025

(65) Prior Publication Data

US 2025/0308548 A1 Oct. 2, 2025

Related U.S. Application Data

(60) Provisional application No. 63/572,474, filed on Apr. 1, 2024.

(51) Int. Cl.
*G11B 5/012* (2006.01)
*G11B 5/00* (2006.01)

(52) U.S. Cl.
CPC ...... *G11B 5/012* (2013.01); *G11B 2005/0021* (2013.01)

(58) Field of Classification Search
CPC ............ G11B 5/6088; G11B 11/10536; G11B 2005/0021; G11B 7/1263; G11B 5/02; G11B 5/09; G11B 5/40; G11B 5/012; G11B 13/08; G11B 5/607; G11B 5/6076; G11B 11/10533
USPC ............................................................ 360/69
See application file for complete search history.

(56) References Cited

U.S. PATENT DOCUMENTS

| | | | | |
|---|---|---|---|---|
| 9,311,943 | B2 | 4/2016 | Canchi et al. | |
| 9,595,288 | B1 | 3/2017 | Chu et al. | |
| 9,916,851 | B1 | 3/2018 | Seigler et al. | |
| 10,540,998 | B2 * | 1/2020 | Tatah | H01S 5/0261 |
| 10,580,446 | B1 * | 3/2020 | Wessel | G11B 5/02 |
| 10,720,177 | B1 | 7/2020 | Ng et al. | |
| 10,902,876 | B2 | 1/2021 | Tatah et al. | |
| 10,997,997 | B1 | 5/2021 | Xiong | |

(Continued)

OTHER PUBLICATIONS

Sakoguchi et al., Mode hopping impact on NFT protrusion measurement in HAMR, IEEE Transactions on Magnetics, Jul. 10, 2023, pp. 2.

*Primary Examiner* — Nabil Z Hindi
(74) *Attorney, Agent, or Firm* — NOD Law PC

(57) ABSTRACT

A data storage device configured for heat assisted magnetic recording (HAMR) may include a disk; a head configured to read/write data to the disk; a laser module comprising a laser diode to heat an area of the disk near the head, and a heater to heat the LD; and one or more processing devices configured to determine a target laser voltage (LV) value for the LD; drive, using an LD driver, the LD, based on the target LV value; determine a temperature adjustment value for the LD; and drive, using a heater driver, the heater to adjust one or more of a LV value and a temperature of the LD, based on the temperature adjustment value. In some embodiments, the one or more processing devices are configured to independently control the LD and heater drivers for a plurality of compensation phases.

19 Claims, 15 Drawing Sheets

(56) References Cited

U.S. PATENT DOCUMENTS

| | | | |
|---|---|---|---|
| 12,190,924 | B1 | 1/2025 | Poss et al. |
| 2016/0087401 | A1 | 3/2016 | Wessel et al. |

* cited by examiner

LASER HEATER FEEDBACK CONTROL IN HEAT ASSISTED MAGNETIC RECORDING

CROSS REFERENCE TO RELATED APPLICATIONS

The present Application for Patent claims priority to U.S. Provisional Application No. 63/572,474, filed Apr. 1, 2024, entitled "Laser Heater Feedback Control in Heat Assisted Magnetic Recording," and assigned to the assignee hereof, which is hereby expressly incorporated by reference herein.

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1A is a conceptual diagram of a prior art disk format 2 comprising a number of radially spaced, concentric servo tracks 4 defined by servo wedges 60-6N recorded around the circumference of each servo track. A plurality of concentric data tracks are defined relative to servo tracks 4, wherein the data tracks may have the same or a different radial density (e.g., tracks per inch (TPI)) than servo tracks 6. Each servo wedge 6, comprises a preamble 8 for storing a periodic pattern, which allows proper gain adjustment and timing synchronization of the read signal, and a synchronization mark 10 (sync mark 10) for storing a special pattern used to symbol synchronize to a servo data field 12. Servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head positioning information is processed to position a head over a target data track during a seek operation, and servo bursts 14 provide fine head position information used for centerline tracking while accessing a data track during write/read operations. A position error signal (PES) is generated by reading servo bursts 14, wherein the PES represents a measured position of the head relative to a centerline of a target servo track. A servo controller processes the PES to generate a control signal applied to one or more actuators to actuate the head radially over the disk in a direction that reduces the PES.

The description provided in this background section should not be assumed to be prior art merely because it is mentioned in or associated with this section. The background section may include information that describes one or more aspects of the subject technology.

SUMMARY

The following summary relates to one or more aspects and/or embodiments disclosed herein. It should not be considered an extensive overview relating to all contemplated aspects and/or embodiments, nor should it be regarded to identify key or critical elements relating to all contemplated aspects and/or embodiments or to delineate the scope associated with any particular aspect and/or embodiment. Accordingly, the following summary has the sole purpose of presenting certain concepts relating to one or more aspects and/or embodiments relating to the mechanisms disclosed herein in a simplified form to precede the detailed description presented below.

Some disk drives employ heat-assisted magnetic recording (HAMR) by using a laser diode to briefly reduce the coercivity of the disk's magnetic material, which allows for higher aerial density (i.e., denser data writing). In some cases, however, laser diodes (LDs) in HAMR drives are susceptible to temperature-induced mode hopping, for instance, during the start of a write operation, seeking between tracks, servo sector or servo wedge crossings, etc. For example, during HAMR write, the temperature of an LD may increase (e.g., by 10-20 degrees C.), and several mode hop critical temperatures may be crossed during this temperature transient. In some circumstances, one or more mode hop events may be triggered during this transient phase, which may adversely impact write performance. In some instances, mode hop events during a HAMR write operation may result in recording non-uniformities, which degrades HAMR recording performance.

Thus, HAMR drives face the issue of "mode hopping," where temperature changes in the LD cause it to switch between different lasing modes, leading to variations in output power and wavelength. This can cause inconsistent heating applied to the media, compromise the reliability of data recording, and reduce heating effectiveness if the new wavelength mismatches the HAMR head's settled wavelength after switching to write mode. Additionally, or alternatively, sudden changes in the lasing mode due to a mode hop event can also cause sudden changes in the width and/or phase of the written data. Hence, effective temperature management of the laser diode is crucial for reliable HAMR data writing operation. Furthermore, effective temperature management can also help mitigate adverse impacts to the aerial density of the data recorded in HAMR drives.

Broadly, aspects of the present disclosure are directed to minimizing or reducing fluctuations in laser power in HAMR drives, which can help mitigate the adverse effects of mode hop events on disk drive performance. Specifically, but without limitation, aspects of the present disclosure can be utilized to adjust the laser temperature during disk drive operation through the use of an independently controlled laser heater, which can help compensate for changes in laser power and mode hops, and thereby enhance disk drive performance, as compared to the prior art. In some embodiments, a HAMR drive may include two drivers (e.g., laser driver, heater driver), which facilitates independent control of the laser diode (or laser) and the laser heater. In this way, aspects of the present disclosure enable the laser heater to provide temperature adjustments for a plurality of laser compensation phases (e.g., look-ahead phase, pre-write compensation phase, write mode compensation phase), as described in further detail below.

In some aspects, the techniques described herein relate to a data storage device configured for heat assisted magnetic recording (HAMR) including: one or more disks; one or more read/write heads configured to read data from and write data to the one or more disks; one or more laser modules, each laser module including: a laser diode (LD) configured to heat an area of one of the one or more disks near one of the one or more read/write heads; and a heater configured to heat the LD; an LD driver; a heater driver; and one or more processing devices configured, individually or in combination, to: independently control the LD driver and the heater driver for a plurality of compensation phases, wherein independently controlling the LD driver and the heater driver includes: determining a target laser voltage (LV) value for a first LD of a first laser module; driving, using the LD driver, a first LD of a first laser module, based on the target LV value; determining a temperature adjustment value for the first LD; and driving, using the heater driver, a first heater to adjust one or more of a LV value and a temperature of the first LD, based on the temperature adjustment value.

In some aspects, the techniques described herein relate to a data storage device, wherein the one or read/write heads include a plurality of read/write heads, and wherein the one or more laser modules include a plurality of laser modules, including at least the first laser module.

In some aspects, the techniques described herein relate to a data storage device, wherein the plurality of compensation phases include a look-ahead phase, a pre-write feedback phase, and a write mode phase.

In some aspects, the techniques described herein relate to a data storage device, wherein the one or more processing devices are further configured, individually or in combination, to: identify a compensation phase from the plurality of compensation phases; and select a control loop scheme, based on the identified compensation phase.

In some aspects, the techniques described herein relate to a data storage device, wherein the control loop scheme includes one of open loop (OL) control or closed loop (CL) control.

In some aspects, the techniques described herein relate to a data storage device, wherein the one or more processing devices are further configured, individually or in combination, to: select a first set of laser modules, wherein the first set of laser modules includes at least the first laser module, and wherein the first set of laser modules is associated with a first set of read/write heads; and assign each read/write head from the first set of read/write heads to a preamp of a plurality of preamps.

In some aspects, the techniques described herein relate to a data storage device, wherein the one or more processing devices are further configured, individually or in combination, to: determine, for each laser module from the first set of laser modules, one or more of: a heater output power for a respective heater during the look-ahead phase; and a corresponding duration for the look-ahead phase.

In some aspects, the techniques described herein relate to a data storage device, wherein a respective heater output power during a look-ahead phase is linked to a corresponding duration of the look-ahead phase and vice-versa.

In some aspects, the techniques described herein relate to a data storage device, wherein the one or more processing devices are further configured, individually or in combination, to: toggle a switch to enable OL control during the look-ahead phase, wherein OL control during the look-ahead phase includes: obtaining a pre-determined Look Ahead Heat value for generating a heater control signal; supplying the heater control signal to the heater driver; and wherein driving the one or more heaters, including at least the first heater, using the heater driver is based on the heater control signal associated with the pre-determined Look Ahead Heat Value.

In some aspects, the techniques described herein relate to a data storage device, wherein the one or more processing devices are further configured, individually or in combination, to: determine a number of sector IDs (SIDs) for the pre-write feedback phase; and determine a number of data blocks for the write mode phase.

In some aspects, the techniques described herein relate to a data storage device, wherein determining the heater output power for the one or more heaters, including at least the first heater, is based at least in part on determining one or more of: an ambient temperature; a pre-write laser voltage (PLVT) target value; and a temperature adjustment value of a corresponding LD.

In some aspects, the techniques described herein relate to a data storage device, wherein: the PLVT target value corresponds to the target LV value to be maintained between an end of the look-ahead phase and a start of the write mode phase, the PLVT target value is determined based on a heater diode equation and the ambient temperature, and the heater diode equation is used to determine an optimal LV value for a particular ambient temperature.

In some aspects, the techniques described herein relate to a data storage device, wherein the control scheme includes CL control when the compensation phase includes the pre-write feedback phase, and wherein the one or more processing devices are further configured, individually or in combination, to: monitor a laser voltage (LV) value at the one or more LDs of the one or more laser modules, including at least the first LD of the first laser module; determine at least one LV error, based on comparing the PLVT target value to a corresponding LV value; and adjust a temperature of the corresponding LD to minimize or reduce the at least one LV error.

In some aspects, the techniques described herein relate to a data storage device, wherein adjusting the temperature of the corresponding LD during the pre-write feedback phase includes: determining a heater bias for minimizing or reducing the at least one LV error; and controlling a heater output power for the respective heater, based on applying the heater bias to the respective heater.

In some aspects, the techniques described herein relate to a data storage device, wherein the one or more processing devices are configured, individually or in combination, to one or more of: end the pre-write feedback phase at or before a start of the write mode phase, wherein the write mode phase includes at least a first data write operation; and determine a plurality of mode hop boundaries to be avoided during the write mode phase, based on identifying a relationship between LD temperatures and LV values.

In some aspects, the techniques described herein relate to a data storage device, wherein the write mode phase includes one or more of mode compensation and LD temperature compensation, and wherein the one or more processing devices are configured, individually or in combination, to: detect mode hops based on a differential signal measurement (dNTS measurement), wherein the dNTS measurement corresponds to a difference between a near-field transducer temperature sensor (NTS) measurement and an embedded contact sensor (ECS) measurement; and adjust a heat output power from the first heater to shift the LD temperature away from the plurality of mode hop boundaries.

In some aspects, the techniques described herein relate to a data storage device, wherein the one or more processing devices are configured, individually or in combination, to: obtain a plurality of LV values at the first LD for a plurality of ambient temperature values; calculate a heat slope value ($Heat_{slope}$) and a heat intercept value ($Heat_{intercept}$), based on obtaining the plurality of LV values for the plurality of ambient temperature values; and determine a heater diode equation for CL feedback for the heater driver when the compensation phase includes the write mode phase, wherein the heater diode equation is used to calculate an optimum LV value ($Closed_{loop\_heat}$) for a specific ambient temperature ($T_{ambient}$); and wherein the heater diode equation is: $Closed_{loop\_heat}=T_{ambient}*Heat_{slope}+Heat_{intercept}$.

In some aspects, the techniques described herein relate to a data storage device, wherein, the one or more processing devices are configured, individually or in combination, to: determine an LV error for the first LD, based at least in part on comparing the optimum LV value ($Closed_{loop\_heat}$) to a measured LV value for the first LD; pass the LV error through a loop compensator to generate a heater control signal; and adjust a heater output power from the first heater to reduce or minimize the LV error for the first LD, based on the heater control signal.

In some aspects, the techniques described herein relate to a method for operating a data storage device configured for heat assisted magnetic recording (HAMR), including: determining a target laser voltage (LV) value for a first laser diode (LD) of a first laser module of the data storage device, wherein the data storage device includes: one or more read/write heads configured to read data from and write data to the one or more disks; an LD driver; a heater driver; and one or more laser modules, each laser module including: an LD configured to heat an area of one of the one or more disks near one of the one or more read/write heads; and a heater configured to heat the LD; driving, using the LD driver, the first LD of the first laser module, based on the target LV value; determining a temperature adjustment value for the first LD; and driving, using the heater driver, a first heater to adjust one or more of a LV value and a temperature of the first LD, based on the temperature adjustment value.

In some aspects, the techniques described herein relate to one or more processing devices configured, individually or in combination, with: means for determining a target laser voltage (LV) value for a first laser diode (LD) of a first laser module of a data storage device, wherein the data storage device includes: one or more read/write heads configured to read data from and write data to the one or more disks; and one or more laser modules, each laser module including: an LD configured to heat an area of one of the one or more disks near one of the one or more read/write heads; and a heater configured to heat the LD; means for driving the first LD of the first laser module, based on the target LV value; means for determining a temperature adjustment value for the first LD; and means for driving a first heater to adjust one or more of a LV value and a temperature of the first LD, based on the temperature adjustment value. Various further aspects are depicted in the accompanying figures and described below and will be further apparent based thereon.

BRIEF DESCRIPTION OF THE DRAWINGS

Various features and advantages of the technology of this disclosure will be apparent from the following description of particular examples of those technologies, and as illustrated in the accompanying drawings. The drawings are not necessarily to scale; emphasis instead is placed on illustrating the principles of the technological concepts. In the drawings, like reference characters may refer to the same parts throughout different views. The drawings depict only illustrative examples of this disclosure and are not limiting in scope.

DETAILED DESCRIPTION

Figure 1A:
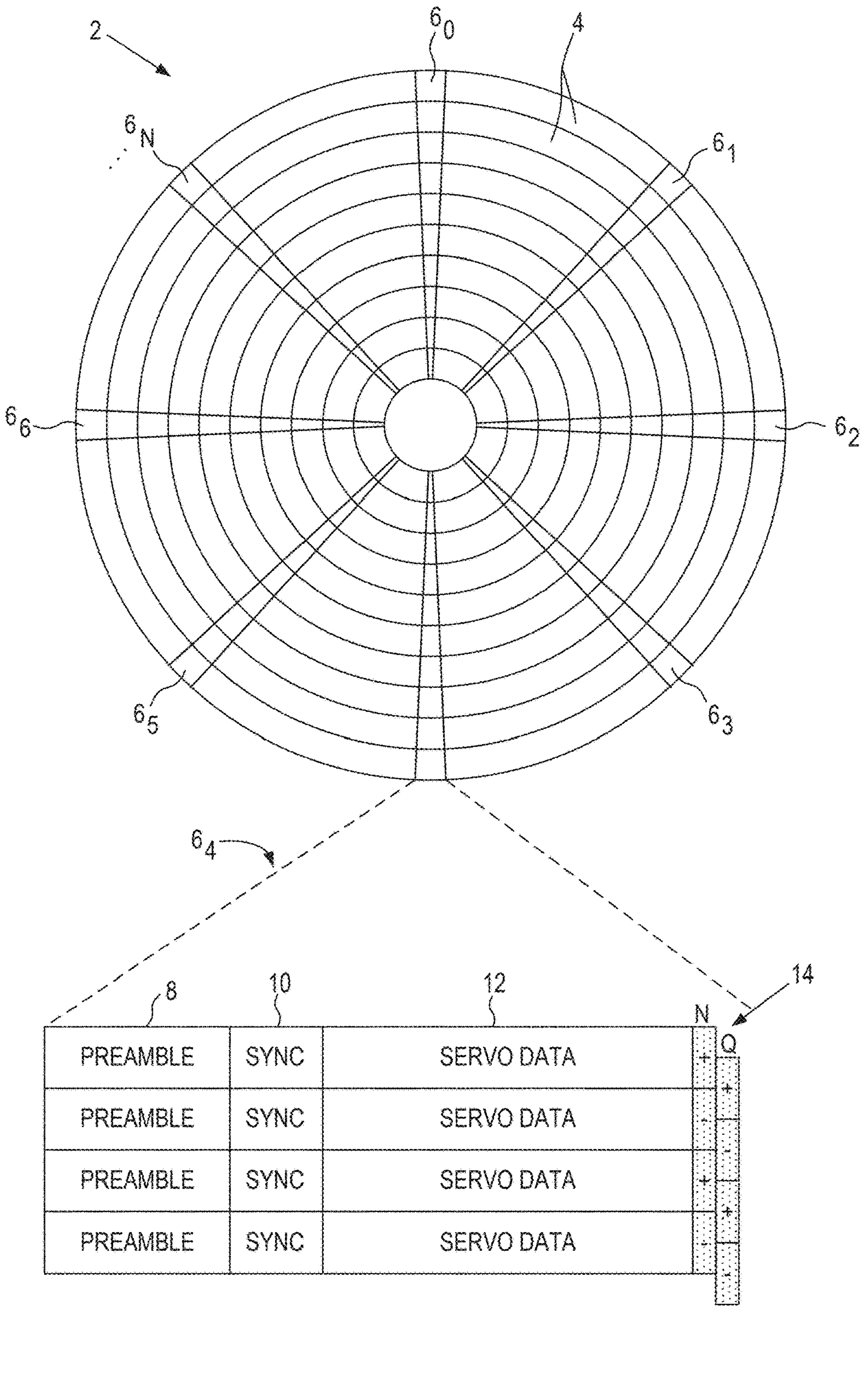
FIG. 1A is a conceptual diagram of a disk format comprising a number of radially spaced, concentric servo tracks defined by servo wedges recorded around the circumference of each servo track, according to various aspects of this disclosure.

The word "exemplary" is used herein to mean "serving as an example, instance, or illustration." Any embodiment described herein as "exemplary" should not be construed as preferred or advantageous over other embodiments.

The embodiments described below are not intended to limit this disclosure to the precise form disclosed, nor are they intended to be exhaustive. Rather, they are presented to provide a description so that others skilled in the art may utilize their teachings. Technology continues to develop, and elements of the described and disclosed embodiments may be replaced by improved and enhanced items. However, the teachings of this disclosure inherently disclose elements used in embodiments incorporating technology available at the time of this disclosure.

The demand for data storage continues to increase rapidly, driving the need for hard drives that can store more data in the same physical space. However, traditional magnetic recording techniques face a physical limit known as the superparamagnetic limit. This is the point at which magnetic bits become so small that thermal fluctuations can cause them to spontaneously change state, leading to data loss. Heat-assisted magnetic recording (HAMR) is a technology developed to address this issue. HAMR overcomes the superparamagnetic limit by using heat to temporarily reduce the coercivity (resistance to changes in magnetization) of the magnetic material on the disk. This is achieved by using a laser diode (LD) to heat a small area of the disk, enabling data to be written at a higher density to that area. As the heated area cools, its coercivity returns to its original elevated level, effectively "locking" the data into place. HAMR allows for much higher data densities than traditional magnetic recording techniques, as it allows data bits to be written much more closely together without the risk of thermal instability.

In HAMR, a phenomenon known as "mode hopping" occurs when the LD used for heating the magnetic material switches, or "hops," between different lasing modes. Each mode corresponds to a different pattern of standing waves within the laser diode's cavity, which in turn corresponds to a specific wavelength of emitted light. Mode hopping in HAMR can be induced by temperature variations in the LD (or LD cavity within which the LD is positioned). As the LD operates, it naturally generates heat. Some non-limiting examples of factors that can affect LD temperature include power input, operation duty cycle, ambient temperature, and heat dissipation mechanisms. As the temperature of the LD changes, it can also impact the refractive index and/or physical dimensions of the LD cavity, potentially shifting the wavelength or frequency of the light emitted by the LD. In some instances, this shift may cause the laser to switch from one mode to another, herein referred to as "mode hopping".

In some circumstances, a laser encounters "mode hops" when the temperature transient changes. For instance, a laser may suddenly switch from operating in one resonator mode (e.g., producing energy with a first wavelength) to another mode (e.g., producing energy with a second, different wavelength) when the temperature transient equals a mode hop critical temperature. The laser then operates in the new resonator mode (e.g., producing energy with the second wavelength) for a range of temperature transients before switching to a different resonator mode (e.g., producing energy with a third wavelength). In some cases, the mode-hop effects induced in a laser can adversely affect the laser's ability to deliver optical power to the disk media in a consistent/effective manner. Furthermore, as noted above, the mode-hop effects are temperature dependent. In some circumstances, the optical power delivered to the disk media may depend on the reflection and/or absorption occurring in the LD and/or the near-field transducer (NFT). Thus, in some regards, the optical power spectrum of the LD is temperature dependent. Additionally, the frequency response of an optical transmission system may depend on the absorption, reflections, and/or physical length (e.g., length of LD cavity and/or waveguide). The combination of the optical power spectrum's temperature dependence and resonances in the optical transmission system may lead to fluctuations in the optical power delivered to the disk media, which can adversely impact HAMR recording performance.

Mode hopping can have several negative consequences in the context of HAMR. Mode hopping can cause sudden changes in the laser's output power and frequency, leading to variations in the heating of the magnetic material. This can result in inconsistent performance and potentially affect the reliability of the data recording process. In some instances, chances for hard errors may also increase due to mode hop event(s) and/or changes in LD temperature, for instance, if the laser output is not optimized for multiple sectors or sector IDs of the disk drive. Moreover, the optical components in the HAMR head may be optimized for a specific wavelength. If mode hopping causes the laser to emit light at a different wavelength, this could reduce the effectiveness of the heating process. Thus, effective temperature management of the LD is critical to mitigate mode hopping and to maintain reliable operation of the HAMR system.

Figure 1B:
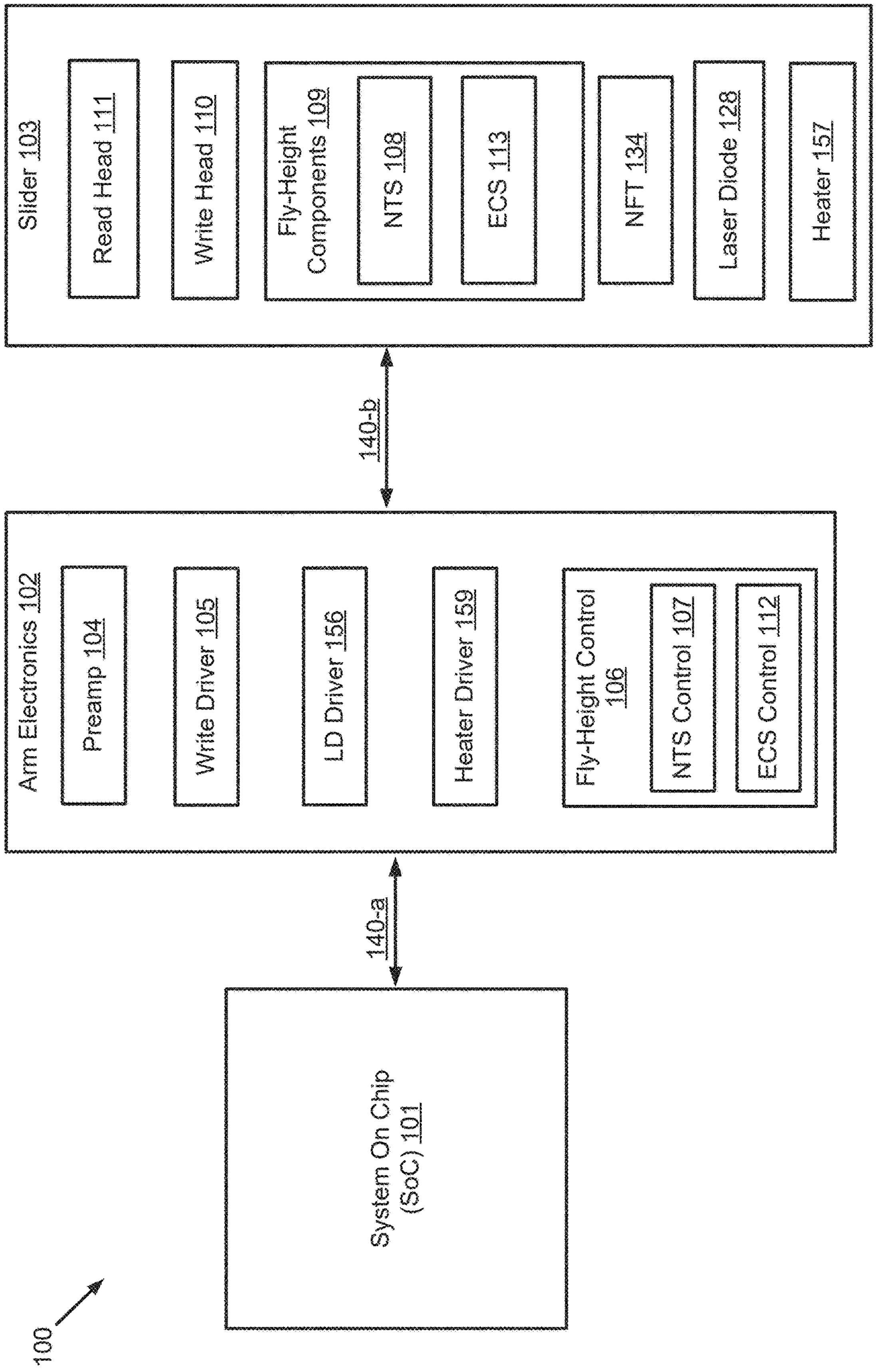
FIG. 1B shows a block diagram illustration of selected components of a disk drive, according to various aspects of this disclosure.

A disk drive 100 according to various aspects of the disclosure, as seen in FIG. 1B, comprises a system on a chip (SoC) 101, where the SoC 101 comprises the electronics and firmware for the disk drive 100 and used to control the functions of the disk drive including providing power and/or control signals to the components shown in arm electronics (AE) 102. Each disk (shown as disk 16 in FIG. 1C, disks 16A-D in FIG. 2B) can have thin film magnetic material on each of the planar surfaces. Each recording surface may comprise a dedicated pair of read and write heads (also collectively referred to as read/write heads or R/W heads) packaged in a slider 103 that is mechanically positioned over the rotating disk 16 by an actuator (e.g., shown as actuator assembly 19 in FIG. 2B). In some examples, the actuator(s) also provide the electrical connections to the slider 103 components. The actuator assembly 19 may also comprise the AE 102, the AE 102 comprising preamplifiers or preamps 104 (e.g., read and/or write preamp) for the heads (e.g., read head 111, write head 110), write driver 105, laser diode (LD) driver 156, heater driver 159, and fly-height controls 106. In some examples, the fly-height control circuit 106 includes a near field transducer (NFT) temperature sensor (NTS) control circuit 107, for example, when the disk drive 100 employs heat assisted magnetic recording (HAMR). The fly-height control circuit 106 may further include an embedded contact sensor (ECS) control circuit 112. In some instances, differential signal measurements (or dNTS measurements) can be obtained based on a difference between the NTS measurements and the ECS measurements.

In this example, the slider 103 can include fly-height components 109, where the fly-height components 109 include an NTS 108 and an ECS 113 in the slider 103. In other words, the HAMR drive 100 can include NTS 108 and ECS 113 in the slider 103 along the associated NTS control circuitry 107 and the ECS control circuitry 112, respectively, in the AE 102. It is noted that some of the components shown in AE 102 can be implemented or partially implemented in SoC 101, according to various aspects of the disclosure. While AE is shown as including preamps 104, AE inclusive of some or all of the functional blocks above other than preamps 104 may be implemented together in a preamp integrated circuit (IC), and AE may be referred to as preamp IC 102 below.

Figure 5:
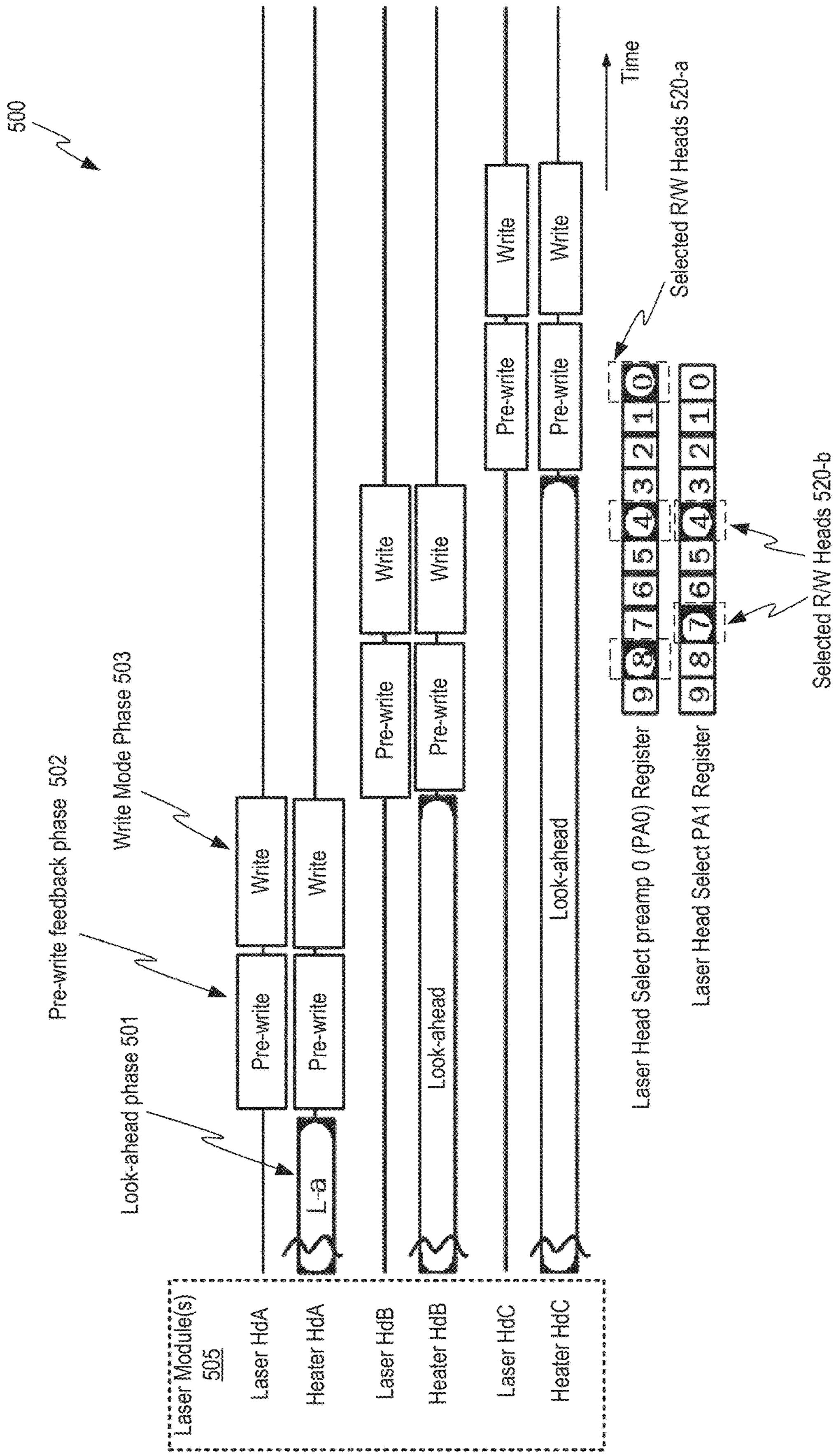
FIG. 5 illustrates a timing diagram for a plurality of laser-heater pairs of a plurality of a heads during a look-ahead phase, according to various aspects of this disclosure.

As seen, a first connection (e.g., flex cable) 140-*a* connects the SoC 101 to the AE 102, while a second connection (e.g., flex cable) 140-*b* connects the AE 102 to the slider 103. The AE 102 typically include digital and analog circuitry that control the signals sent to the components in the slider 103 and process the signals received from the components of the slider 103. The AE 102 can include registers that are set using serial data received from the SoC 101 to provide parameters for the various functions performed by the AE. For example, as described with reference to FIG. 5 below, one or more registers may be utilized to select the read/write heads (or laser head(s)) for each of the one or more preamps (e.g., Laser Head Select PA0 Register, Laser Head Select PA1 Register). For example, FIG. 5 shows the selected read/write heads 520-*a* for Laser Head Select PA0 Register and the selected read/write heads 520-*b* for Laser Head Select PA1 Register. In some examples, the write driver 105 generates an analog signal that is applied to an inductive coil in the write head 110 to write data by selectively magnetizing portions of the magnetic material on the surface of the rotating disk(s) 16. It is noted that while AE is so named as the electronic components are generally placed at the arm actuators in various embodiments, the actual physical location of the AE may vary in other embodiments.

As a disk rotates under a slider of a hard disk drive (HDD), the slider 103 is said to "fly" above the disk. In some cases, a thermal fly-height control (TFC) device (e.g., heater element, such as, but not limited to heater 157) can be disposed within the slider 103 to contort the slider near the read and write transducers (or elements) and thereby vary the fly-height for the read and write transducers. In some examples, read and write elements or transducers reside in the slider 103 of the disk drive 100. In some cases, the disk drive 100 comprises fly-height control circuitry 106 that interfaces with fly-height components 109 in the slider 103. TFC is one example of a control technique that uses a heater 157 disposed in the slider 103. The fly-height can be adjusted by heating the slider 103 with the heater 157. Electrical current supplied to the heater 157 by fly-height control circuitry 106 generates heat to thermally expand the slider 103 and modulate the fly-height. As seen, the slider 103 also includes fly-height components 109 and the NTS 108. In some embodiments, the heater 157 can be implemented in the fly-height components 109.

In some cases, the disk drive 100 may utilize TFC of the read/write heads. One type of TFC uses an electrically resistive heater (e.g., heater 157) located on the slider 103 near the head (e.g., read head 111, write head 110). In some cases, the heater 157 may also be positioned adjacent or near the LD 128, shown more clearly in FIG. 1C. When current is applied to the heater 157, for instance, using the heater driver 159, the heater expands and causes the head to expand and thus move closer to the disk surface (e.g., surface of disk 16 in FIG. 1C). The head can be adjusted to different heights, depending on whether the disk drive 100 is reading data from, or writing data to, the disk 16. In some examples, the TFC heater, such as heater 157, may be accurately calibrated so that the head-disk spacing can be controlled, where calibration may entail urging the head toward the disk until contact is made ("touchdown") at which point the slider is urged away from the disk ("pull-back"). In some cases, the ECS 113 embedded in the slider 103 near the write head 110 and/or read head 111, can be used to sense touchdown. The ECS 113 may include a metallic strip located at the slider air bearing surface (ABS) or gas bearing surface (GBS). The resistance of the ECS 113 may change in response to temperature changes (e.g., when the slider 103 temperature changes as it comes in close proximity to the disk). In some instances, touchdown can be determined based on monitoring the voltage across the ECS 113.

Thus, the slider 103 includes write head 110 configured to write data to a disk (e.g., disk 16), a read head 111 configured to read data from the disk, fly-height components 109 configured to adjust slider fly-height (as described above) and one or more resistive temperature detectors (RTDs) for sensing the temperature near the ABS or GBS. In some cases, the one or more RTDs may include one or more of a first RTD (e.g., NTS 108) and a second RTD (e.g., ECS 113). It is noted that ABS is generally used to describe the surface of the slider 103 facing the disk 16, where the disk drive could be filled with gases other than air (e.g., gases containing helium, nitrogen, to name two non-limiting examples) and that the use of the "ABS" term to describe various aspects of the disclosure is not intended to limit the disclosure to air filled drives. Accordingly, the term "gas bearing surface" or "GBS" can be used instead.

In some cases, the NTS 108 and/or ECS 113 is located proximate to the GBS/ABS and write head 110 (or alternatively the read head 111). The NTS 108 and/or ECS 113 facilitates detecting a temperature generated by the slider's proximity to the disk or media. In various embodiments, the NTS 108 and/or ECS 113 may comprise a thermal strip (e.g., metallic or semiconductor strip) on the slider 103. In some cases, the relative temperature at the ABS may be used to estimate the resistance, $R_{RTD}$, of the RTD, such as the ECS 113 or the NTS 108. Typically, the resistance of a material can be represented as a function of its intrinsic resistance and its dimensions (e.g., length, width, thickness, or height).

In some cases, HAMR drives, such as disk drive 100, may utilize a laser source and optical waveguide with an NFT 134, where the NFT 134 may be located at the GBS (or ABS). Furthermore, the NTS 108 may be located near the NFT 134 for monitoring its temperature. In some cases, the NFT 134 employs "near field optics," and is optically coupled to the waveguide (e.g., waveguide 131 in FIG. 1C) of the HAMR drive, described in further detail below.

In some cases, a HAMR recording head (e.g., write head 110) may include optical components that direct light from a laser to the disk. During recording, a write element applies a magnetic field to a heated portion of the storage medium or disk 16, where the heat lowers the magnetic coercivity of the media, allowing the applied field to change the magnetic orientation of the heated portion. The magnetic orientation of the heated portion determines whether a one ('1') or a zero ('0') is recorded. Thus, by varying the magnetic field applied to the magnetic recording medium while it is moving, data can be encoded onto the storage medium (or magnetic recording medium).

In accordance with aspects of the present disclosure, an independent heater driver and laser driver architecture may be utilized, which allows the heater 157 and LD 128 to be controlled independently of each other. For example, as shown in FIG. 1B, the AE 102 includes the LD driver 156 and the heater driver 159, where the LD driver 156 is used to drive the LD 128 and the heater driver 159 is used to drive the heater 157 on the slider 103. While not shown, in some embodiments, one or more of the heater driver 159 and the LD driver 156 can be located on the preamp 104. In either case, independent control of the LD 128 (or laser 128) and heater 157 in the HAMR drive 100 enables the laser heater 157 to provide temperature adjustments to the LD 128 during a plurality of phases of disk drive operation, which serves to enhance data integrity, reduce or minimize mode hop occurrences, and/or reduce laser power fluctuations. As described in further detail below, some non-limiting examples of the phases (also referred to as compensation phases) associated with disk drive operation include a look-ahead phase (e.g., look-ahead phase 401 in FIG. 4, also referred to as LA phase 401), pre-write feedback phase (e.g., pre-write feedback phase 402), and a write mode phase (e.g., write mode phase 403). In some embodiments, one or more of the phases (e.g., LA phase, write mode phase) may employ open loop (OL) control for laser heater adjustment (e.g., using the laser heater 157 to adjust a temperature of the LD 128). Additionally, or alternatively, one or more of the phases (e.g., pre-write feedback phase) may employ closed loop (CL) control for laser heater adjustment. In some embodiments, CL control may be utilized for laser heater adjustment during the write mode phase.

Figure 1C:
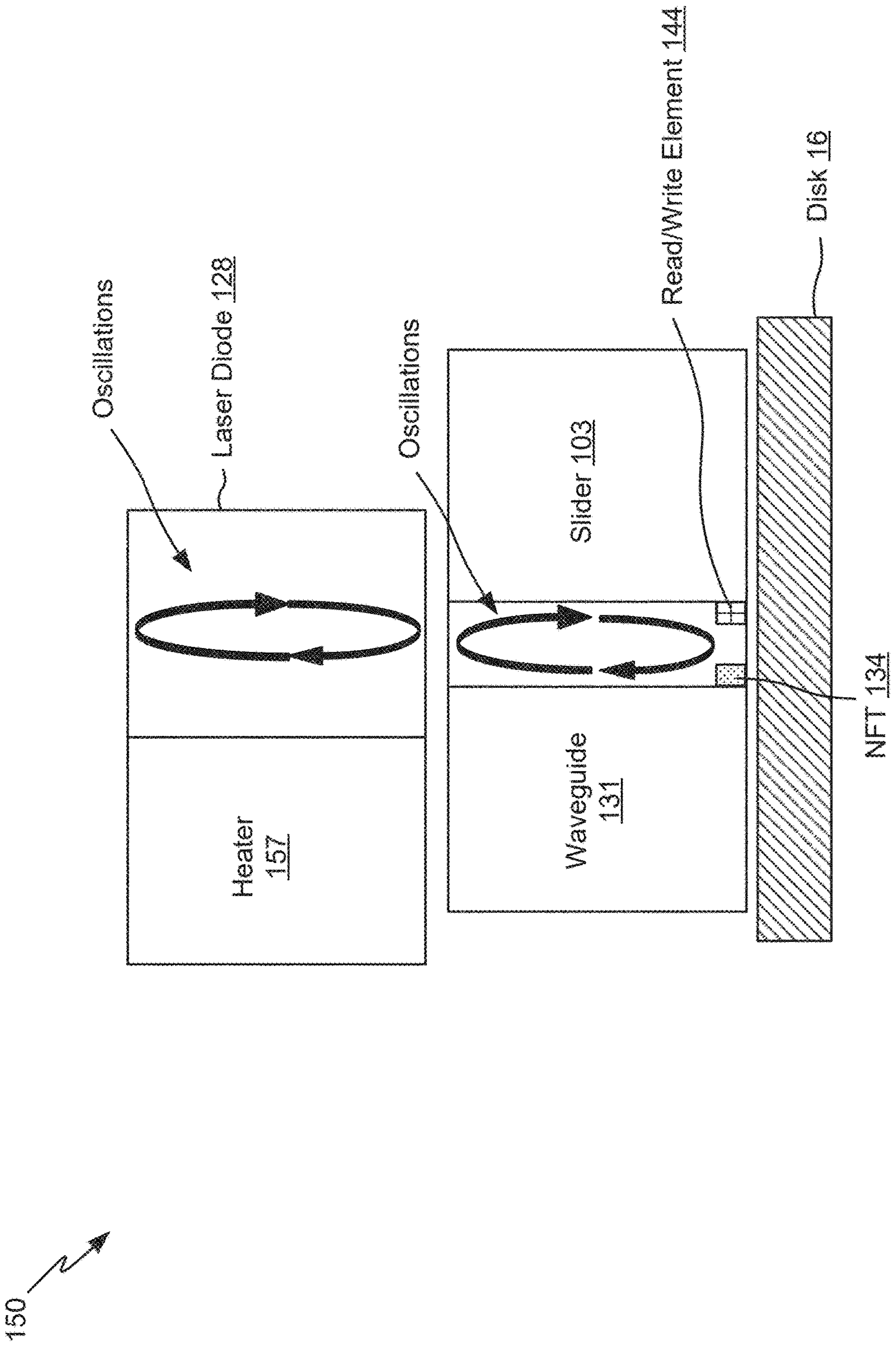
FIG. 1C illustrates a block diagram showing a waveguide, a heater, a laser diode, a disk, and a slider of a data storage device, according to various aspects of this disclosure.

Turning now to FIG. 1C, which shows an example of a HAMR drive 150 employing a laser diode (LD) 128 and a heater 157, according to various aspects of the present disclosure. The HAMR drive 150 can implement one or more aspects of the disk drive 100 described herein, including at least in relation to FIG. 1B. In some examples, the LD 128 is utilized to heat the media to aid in the recording process. In this example, the LD 128 is disposed within an LD cavity and is proximate to a HAMR read/write element 144, where the HAMR read/write element 144 has one end on the ABS of the slider, such as slider 103 in FIG. 1B. The ABS faces and is held proximate to a moving media surface (e.g., surface of disk 16) during operation of the HAMR drive 150.

The LD 128 provides optical-based energy to heat the media surface, e.g., at a point near the read/write element 144. In some cases, optical path components, such as a waveguide 131, can be formed integrally within the slider 103 to deliver light from the LD 128 to the NFT 134 which provides targeted heat to the media/disk. For example, as shown in FIG. 1C, a waveguide 131 and NFT 134 are located proximate to the read/write element 144 to provide local heating of the media or disk 16 during write operations. In some circumstances, various components (e.g., read/write element 144, NFT 134, LD 128, etc.) may experience significant heating due to light absorption and inefficiencies in electrical-to-optical energy conversion as energy produced by the LD 128 is delivered to the magnetic recording medium or disk 16. In some cases, for example, during the start of a write operation, the temperature of the LD 128 experiences significant variations, causing a shift in laser emission wavelength. This in turn can inadvertently lead to a change of optical feedback from the optical path in the slider 103 to the LD cavity, resulting in mode hopping (i.e., power instability) of the LD 128. Mode hopping can degrade performance of HAMR drives, as mode hopping leads to shifting/jumping of laser output power leading to one or more of magnetic track width variations and magnetic transition shifting between data blocks. Large transition shifts in data blocks may increase errors, degrading disk drive performance and/or causing encroachment on adjacent data tracks.

In some instances, mode hop events can also lead to quick (e.g., <100 ns) changes in data phase relationships. Furthermore, mode hop events can cause the laser (or LD 128) to be held in an underpowered state (or alternatively, an overpowered state) across multiple sectors of data. In such cases, this non-optimum laser power output can lead to overwrite or underwrite conditions. For instance, track width disturbances resulting from mode hop events may lead to overwrite or underwrite of adjacent data tracks. In such cases, hard read error events may occur if the overwrite or underwrite conditions are not adequately compensated for.

Some aspects of the present disclosure are directed to a technique for laser heater feedback control using a plurality of laser compensation phases. In some embodiments, a multi-phase temperature adjustment scheme can be implemented by driving the heater and laser of the slider in an independent manner. For example, as shown in FIG. 1B, the heater driver 159 can be used to drive the heater 157, while the LD driver 156 can be used to drive the LD 128 in in the slider 103. In one non-limiting example, three (3) laser compensation phases can be utilized, where a first phase can include a look-ahead phase (e.g., LA phase 401), a second phase can include a pre-write feedback phase (e.g., pre-write feedback phase 402), and a third phase can include a write mode phase (e.g., write mode phase 403).

Figure 3:
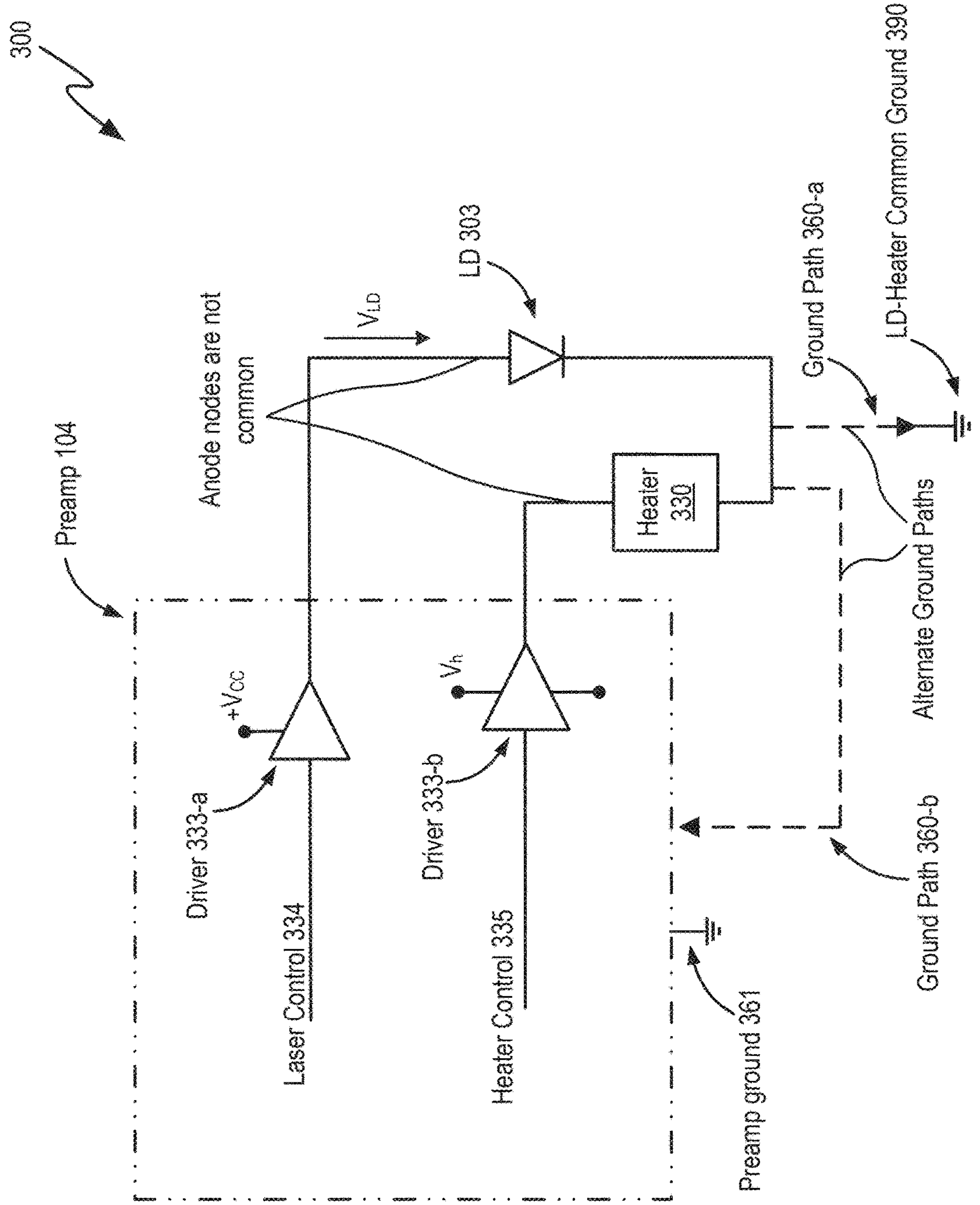
FIG. 3 illustrates a schematic diagram of a driver architecture for a heat assisted magnetic recording (HAMR) drive showing a laser diode and a heater, each driven using a separate driver, according to various aspects of this disclosure.

FIG. 3 shows an example of a driver circuit 300 configured for independent heater and laser control, according to various aspects of the present disclosure. As seen, the driver circuit 300 comprises the preamp 104, where the preamp 104 includes a first driver 333-*a* (or LD driver 333-*a*) and a second driver 333-*b* (or heater driver 333-*b*), where the LD driver 333-*a* is connected to a LD 303 and the heater driver 333-*b* is connected to a heater 330. In some examples, the laser driver 333-*a* and the heater driver 333-*b* are included in the preamp 104 or AE 102, while the LD 303 and heater 330 are in the slider 103. In some embodiments, the LD 303 may be similar or substantially similar to the LD 128 in FIGS. 1B and/or 1C. Additionally, the heater 330 may be similar or substantially similar to the heater 157 described above with reference to FIGS. 1B and/or 1C. Lastly, the drivers 333-*a* and 333-*b* can implement one or more aspects of the LD driver 156 and heater driver 159, respectively.

As shown in FIG. 3, the node corresponding to the laser anode and the node corresponding to the heater node are not common. In other words, the laser or LD 303 and the heater 330 are independently controlled. In some embodiments, the LD driver 333-*a* is configured to receive a laser control input 334 and output a voltage, $V_{LD}$, for driving the LD 303. Similarly, the heater driver 333-*b* is configured to receive a heater control input 335 and output a voltage, $V_h$, to the heater 330. In this way, the LD 303 and heater 330 in the slider (e.g., slider 103 in FIG. 1B) can be independently controlled using the drivers 330-*a* and 330-*b*, respectively. In some cases, the laser 303 (or LD 303) can be an example of a vertical-cavity surface-emitting laser (VCSEL) or edge-emitter laser device, although other types of lasers or LDs known or contemplated in the art can also be utilized without departing from the scope and/or spirit of the present disclosure.

FIG. 3 also illustrates the use of alternate ground paths for the heater 330 and the LD 303, in accordance with various aspects of the disclosure. In some examples, the heater 330 and the LD 303 may have a common ground path 360-*a* to an LD-heater common ground 390. Alternatively, the LD 303 may be grounded to the ground 390 via ground path 360-*a*, while another ground path 360-*b* may be used to connect the heater 330 to the preamp ground 361.

It should be noted that one or more aspects of the present disclosure can be implemented using hardware modifications, firmware modifications, and/or modifications to the internal preamp control.

Figure 2A:
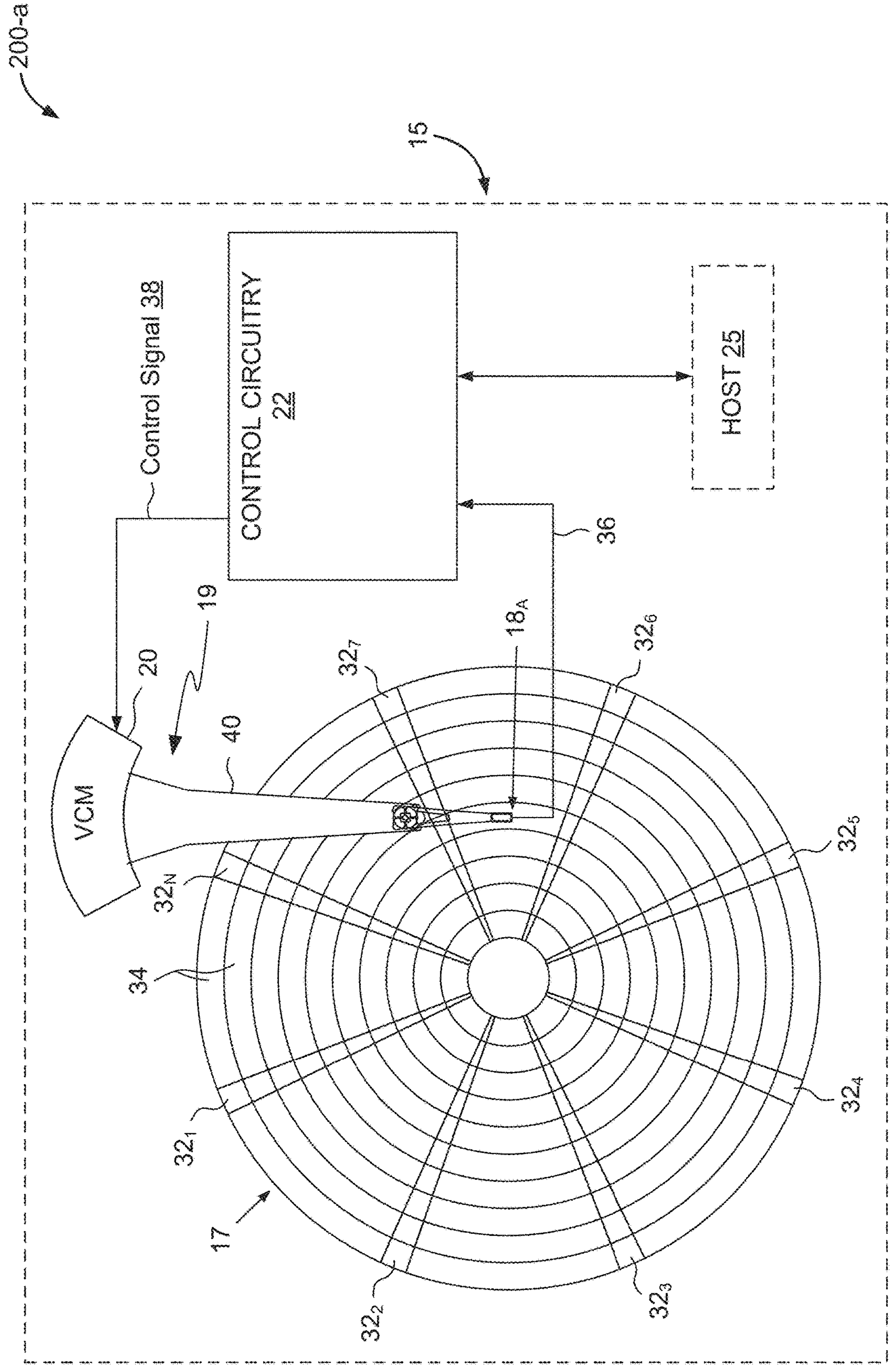
FIG. 2A is a conceptual block diagram of a top view of a data storage device in the form of a disk drive, according to various aspects of this disclosure.
Figure 2B:
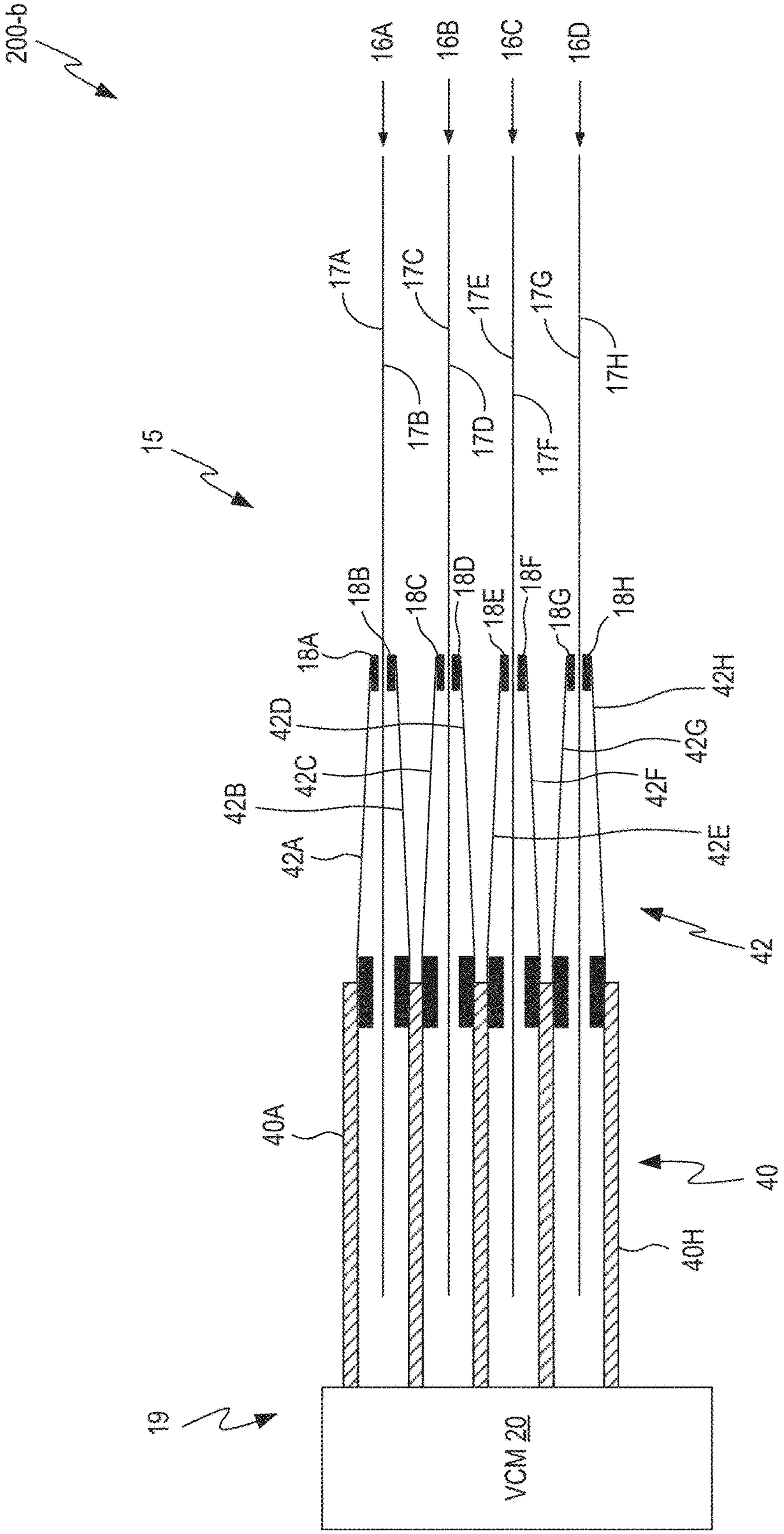
FIG. 2B is a conceptual block diagram of a side view of the data storage device in FIG. 2A, according to various aspects of this disclosure.

FIGS. 2A and 2B are conceptual top and side views 200-*a* and 200-*b*, respectively, of a data storage device in the form of disk drive 15, in accordance with various aspects of this disclosure. Disk drive 15 implements one or more aspects of the disk drives 100 and/or 150 described above in relation to FIGS. 1B and/or 1C, respectively. As seen in FIGS. 2A-2B, the disk drive 15 comprises control circuitry 22, actuator assembly 19, and a plurality of hard disks 16 (i.e., disks 16A, 16B, 16C, 16D).

Actuator assembly 19 is configured to position one or more heads 18 over disk surfaces 17 of one or more disks 16.

Head(s) 18 comprise write and read elements, configured for writing and reading control features and/or data to and from a corresponding disk surface 17 (e.g., disk surfaces 17A, 17B, 17C, 17D, 17E, 17F, 17G, 17H) of disk(s) 16. In some cases, head(s) 18 may be similar or substantially similar to the read head 111 and/or write head 110 described in relation to FIG. 1B. As seen in the side view 200-*b* shown in FIG. 2B, actuator assembly 19 comprises primary actuator 20 (e.g., a voice coil motor ("VCM")) and a number of actuator arms 40 (e.g., topmost actuator arm 40A, lowest actuator arm 40H). Each actuator arm 40 comprises a head 18 at a distal end thereof (e.g., head 18A at a distal end of topmost actuator arm 40A in FIGS. 2A-2B). Each actuator arm 40 is configured to suspend a respective head 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). In the example shown in FIG. 2B, a suspension assembly 42 (e.g., suspension assembly 42A, suspension assembly 42B, suspension assembly 42C, suspension assembly 42D, suspension assembly 42E, suspension assembly 42F, suspension assembly 42G, suspension assembly 42H) is positioned at a distal end of a respective actuator arm 40, and a head 18 (e.g., head 18A, head 18B, head 18C, head 18D, head 18E, head 18F, head 18G, head 18H) is positioned at a distal end of a respective suspension assembly 42. Numerous examples may include a wide variety of other numbers of hard disks and disk surfaces, other numbers of actuator arm assemblies and primary actuators, other numbers of suspension assemblies, and/or other numbers of fine actuators on each actuator arm than those illustrated in FIGS. 2A-2B.

FIG. 2A also depicts servo sectors 32 (e.g., servo sectors 321 through 32N) written onto disk surfaces 17 (e.g., disk surfaces 17A, 17B, 17C, 17D, 17E, 17F, 17G, 17H). Servo sectors 32 may be written to disk surfaces 17 to define a plurality of evenly spaced, concentric tracks 34. Each servo sector 32 may include a phase lock loop (PLL) field, a servo sync mark (SSM) field, a track identification (TKID) field, a sector ID, and a group of servo bursts (e.g., an alternating pattern of magnetic transitions) that the servo system of the disk drive samples to align a head 18 with and relative to a particular track 34. Each track 34 includes a plurality of embedded servo sectors 32 utilized in seeking and track following. Servo sectors 32 are spaced sequentially around the circumferences of circumferential tracks 34 and extend radially outward from the inner diameter (ID) of disk surface 17. Servo sectors 32 contain servo information utilized in seeking and track following and are interspersed between data regions on disk surfaces 17. Data is conventionally written in the data regions in a plurality of discrete data sectors. Each data region is typically preceded by a servo sector 32.

Control circuitry 22 may also process a signal 36 emanating from a head 18 to demodulate servo data written on the disk (e.g., servo sectors 32) to generate a position error signal (PES) representing an error between the actual position of the head and a target position relative to a target track. Control circuitry 22 may process the PES using a suitable servo control system to generate control signal 38 (e.g., a voice coil motor (VCM) control signal, or another applicable control signal) applied to VCM 20 which rotates actuator arm 40 about a pivot in order to actuate head 18 radially over disk surface 17 in a direction that reduces the PES. In some embodiments, disk drive 15 may also comprise a suitable micro actuator, such as a suitable piezoelectric (PZT) element for actuating head 18 relative to a suspension (e.g., suspension assembly 42 in FIG. 2B), or for actuating a suspension relative to actuator arm 40.

Host 25 may be a computing device such as a desktop computer, a laptop, a server, a mobile computing device (e.g., smartphone, tablet, Netbook, to name a few non-limiting examples), or any other applicable computing device. Alternatively, host 25 may be a test computer that performs calibration and testing functions as part of the disk drive manufacturing processing.

Each read/write head 18 is conventionally embedded in the trailing edge of a component known as a slider (e.g., slider 103 in FIGS. 1B and/or 1C). The slider in turn is affixed to a suspension (e.g., suspension assembly 42), which is found at the terminating end of actuator arm 40. As disk 16 spins at a high speed, the slider is lifted, or 'flies', above disk 16. It hovers on a thin layer of air (or gas), maintaining a stable distance measured in nanometers from disk surface 17. This minuscule distance permits read/write heads 18 to retrieve or store data while avoiding direct physical contact with disk surface 17, thereby preventing data corruption and potential damage to disk surface 17.

Figure 2C:
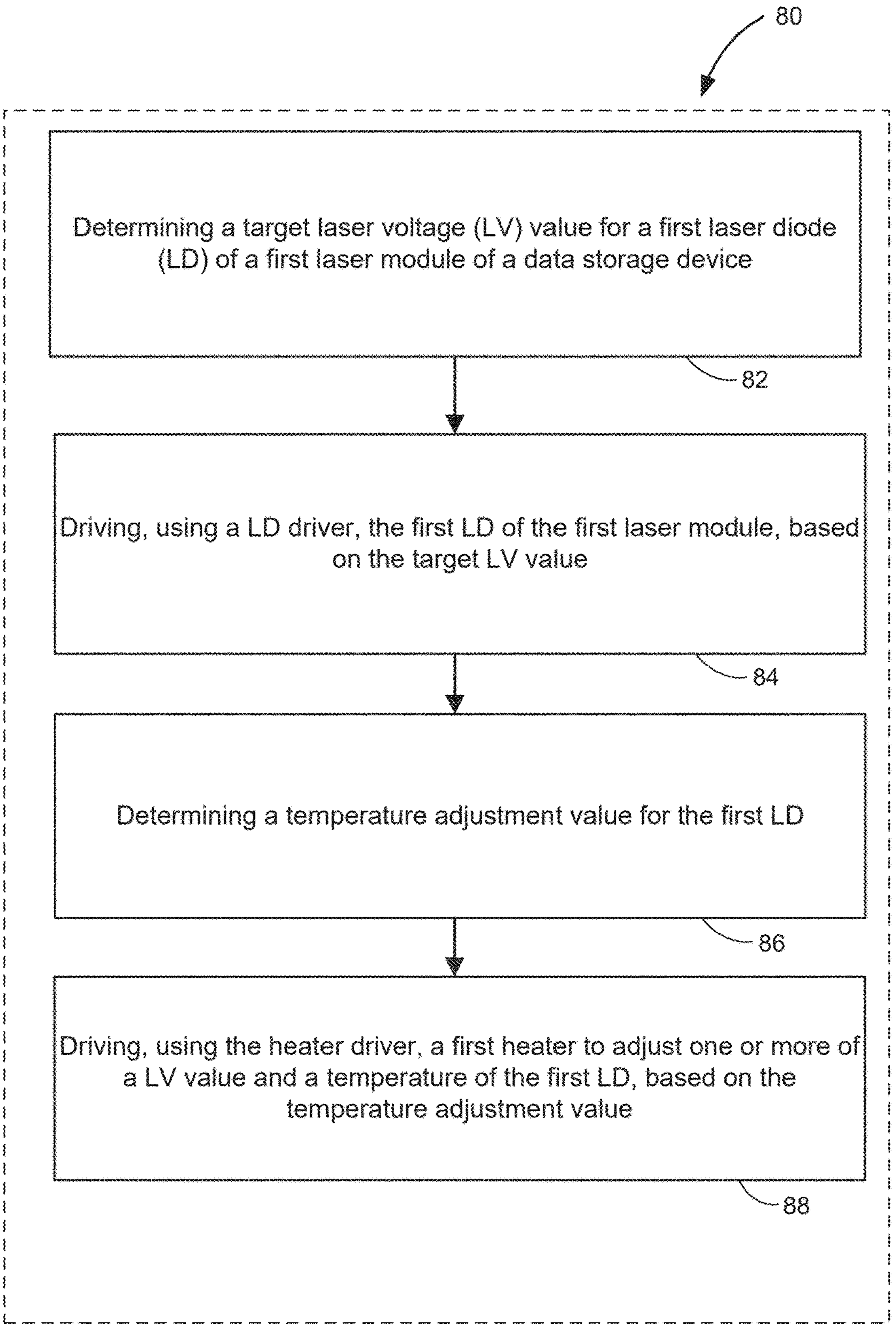
FIG. 2C is a method of operating a data storage device, according to various aspects of this disclosure.

FIG. 2C illustrates an examples of a method (80) for operating a data storage device, according to various aspects of the disclosure. The data storage device comprises at least one or more disks, one or more read/write heads configured to read data from and write data to the one or more disks, one or more laser modules, where each laser module includes: a laser diode (LD) configured to heat an area of one of the one or more disks near one of the one or more read/write heads and a heater configured to heat the LD. The data storage device may further comprise an LD driver and a heater driver, which allows for the LD and the laser heater to be independently driven. The data storage device may further include one or more processing devices that are configured, individually or in combination, to perform the operations 82-88 described below.

A first operation (82) comprises determining a target laser voltage (LV) value for a first laser diode (LD) of a first laser module of the data storage device. A second operation (84) comprises driving, using the LD driver, the first LD of the first laser module, based on the target LV value. A third operation (86) comprises determining a temperature adjustment value for the first LD. Lastly, a fourth operation (88) comprises driving, using the heater driver, a first heater to adjust one or more of a LV value and a temperature of the first LD, based on the temperature adjustment value.

Figure 4:
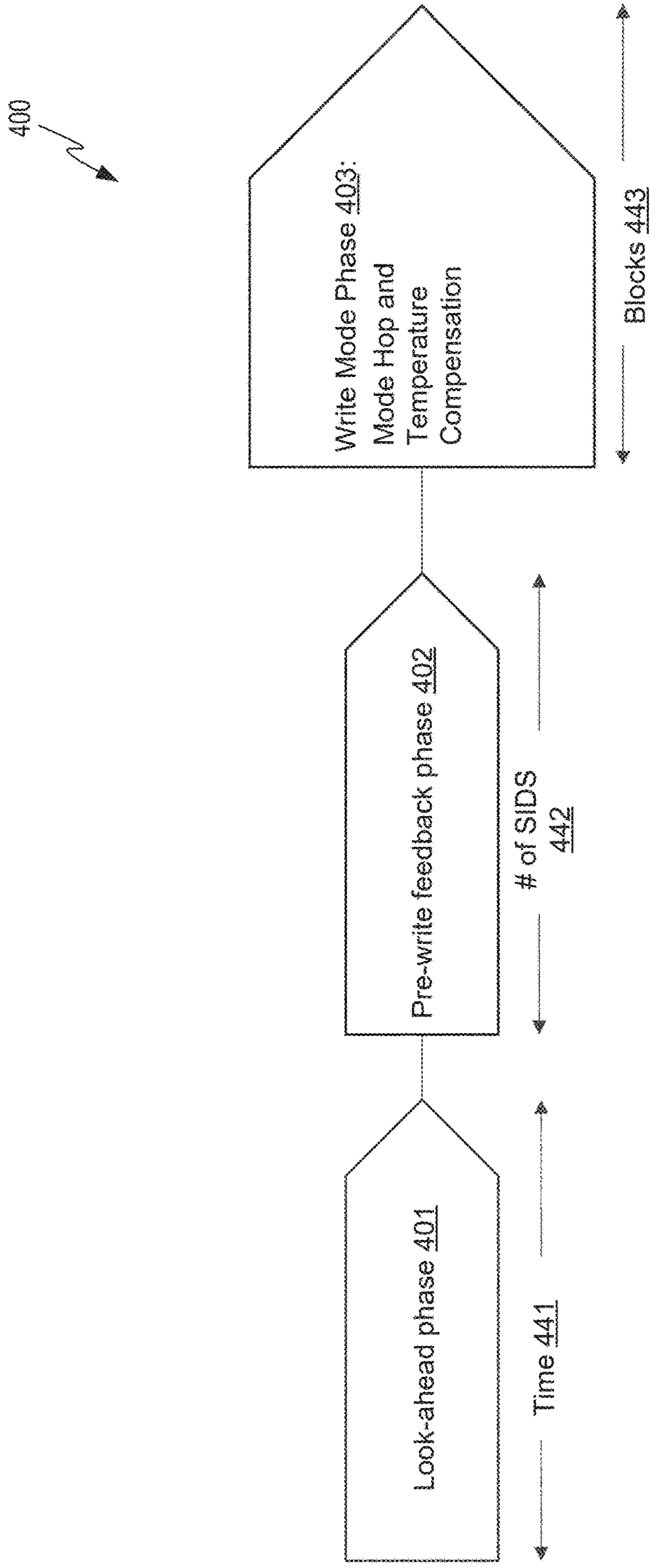
FIG. 4 illustrates a process flow showing various temperature adjustments phases for a HAMR drive, according to various aspects of this disclosure.

FIG. 4 illustrates an example of a process flow 400 for laser heater feedback control 400, according to various aspects of the disclosure. As noted above, some aspects of the disclosure are directed to a technique for independently driving a heater and a laser (or LD) of a HAMR drive. Such a design allows multi-phase temperature adjustments in the HAMR drive, which can help enhance write data integrity by not only reducing mode hope occurrences, but also laser power fluctuations, as compared to the prior art.

In some examples, the disclosed technique can provide temperature adjustments in three phases (also referred to as laser compensation phases, LD compensation phases, and/or temperature adjustment phases) of a disk drive operation. For instance, FIG. 4 depicts a look-ahead phase 401, a pre-write feedback phase 402, and a write mode phase 403. As shown in FIG. 4, time 441 corresponds to the duration of the look-ahead phase 401. In some cases, the pre-write feedback phase 402 may span a pre-determined number of servo sectors (also referred to as servo IDs or SIDs) 442, and the write mode phase 403 may span a pre-determined number of data blocks 443 (e.g., anywhere between 2,000-10,000 blocks, around 4,000 blocks, etc.). In one non-limiting example, the duration of the look-ahead phase 401 may correspond to the time it takes for 0.5-2 revolutions (or revs) of the disk 16, for instance, anywhere between 2-20 ms, around 8 ms, etc. In one non-limiting example, the pre-write feedback phase 402 may span around 10-30 SIDs, for instance, 20 SIDs. In some other cases, pre-write feedback phase 402 may span a pre-defined duration. In such cases, the duration of the pre-write feedback phase 402 may be anywhere between 200-400 μs, for instance, around 300 μs. Additional details on the look-ahead phase (or LA phase 401), pre-write feedback phase 402, and write mode phase 403 are described below with reference to FIGS. 5-8B.

FIG. 5 depicts an embodiment (500) showing the look-ahead phase, according to various aspects of the disclosure. During the look-ahead phase, the firmware (FW) of the HAMR drive can determine which heater(s) should be turned on before the pre-write phase/stage, such as pre-write feedback phase 402 in FIG. 4. In some examples, the HAMR drive can comprise a plurality of laser module(s) 505, where each laser module is associated with one read/write head and comprises a laser (or LD) and a heater. That is, each read/write head of the HAMR drive 100 and/or 150 can comprise a laser and a heater (which may be a dedicated heater for that laser), and the FW can be configured to determine (1) the assignment of one or more read/write heads to one or more preamps (e.g., preamp 104) of the HAMR drive, (2) the duration of the look-ahead phase (e.g., LA phase 401) for the various heaters of the selected read/write heads 520, as well as (3) the timing of the various stages (i.e., look-ahead phase, pre-write phase, and write phase) for the assigned or selected read/write heads.

In some cases, a laser module may include a laser and a heater for a particular head. FIG. 5 depicts three (3) laser modules within the laser module(s) block 505. Here, the laser module(s) block 505 of the HAMR drive depicts a first laser module comprising a first laser (shown as 'Laser HdA') and a first heater (shown as 'Heater HdA') for a first head ('headA'); a second laser module comprising a second laser ('Laser HdB') and a second heater ('Heater HdB') for a second head ('headB'); and a third laser module comprising a third laser ('Laser HdC') and a third heater ('Heater HdC') for a third head ('headC'). It should be noted that the number of heads, lasers, and/or heaters depicted in FIG. 5 is not intended to limit the scope and/or spirit of the present disclosure, and other numbers of heads, lasers and/or heaters can be utilized in different embodiments.

In this example, the HAMR drive includes two preamps (e.g., PA0 and PA1), where each preamp can support a maximum of 4 read/write heads. However, in other embodiments, the HAMR drive may include more than 2 preamps, where each preamp may be configured to support more or less than 4 read/write heads. For example, in some cases, the number of read/write heads that can be supported by each preamp may be limited by the thermal limit of the respective preamp. As an example, in some embodiments, the thermal limit of a preamp in a HAMR drive may allow it to support a maximum of 6 heads or 8 heads, in which case up to 6 or 8 read/write heads can be selected for that preamp. As shown in FIG. 5, the FW selects the heads for each preamp through the laser head select registers (e.g., laser head select PA register, laser head select PA1 register). For example, the FW may select the heads (i.e., selected read/write heads 520-*a*) corresponding to the 0, 4, and 8 registers on the laser head select preamp (PA0) register and the heads (i.e., selected read/write heads 520-*b*) corresponding to registers 4 and 7 on the laser head select preamp (PA1) register.

As depicted in FIG. 5, the FW may time the look-ahead phase 501, pre-write feedback phase 502, and/or write mode phase 503 for each laser module (e.g., a first laser module comprising the laser and heater for head A, a second laser module comprising the laser and heater for head B, and a third laser module comprising the laser and heater for head C). During the look-ahead phase, the control circuitry 22 is configured to control the amount of power for each heater (e.g., heater 330) using a heater control signal, such as heater control 335 in FIG. 3. In some cases, the preamp includes the laser driver (e.g., laser driver 333-*a*) and the heater driver (e.g., heater driver 333-*b*), while the laser module comprising the laser and heater is included on the slider 103. The heat generated by a heater of a particular head may be based on the voltage/bias (shown as $V_h$ in FIG. 3) used to drive said heater. In some cases, a higher heater power (i.e., than the target or ideal power) may be utilized for one or more heaters during the look-ahead phase to reduce the amount of time spent in the look-ahead phase. For example, a higher power may be used for the heater of head 'B' to reduce the duration of the look-ahead phase for head B, for instance, compared to the look-ahead duration for head C. Additionally, or alternatively, a higher power may be used for the heater of head 'A' to reduce the duration of the look-ahead phase for head A, as compared to the look-ahead durations for heads B and C. In one non-limiting example, the heater of head A may utilize a lower amount of power than the heaters of heads B and/or C. In other cases, the same or substantially the same heater power may be used for each heater during the look-ahead phase. In the example shown in FIG. 5, if heads A, B, and C are turned on at the same time and any prior write event was a relatively time long ago (i.e., such that the heads are around the same temperature), the heater power for head A>heater power for head B>heater power for head C, since head C has the longest look-ahead duration.

In some other cases, however, the selected heads may be turned on at different times. For example (not depicted in FIG. 5), head A may have been turned on before head B, and head B may have been turned on before head C, in which case it is feasible that the heater power for heads A, B, and C may be the same or substantially the same. In some aspects, the FW of the data storage device may be configured to calculate a look-ahead setting (e.g., a look-ahead duration and/or a heater power) for the one or more read/write heads based on one or more of an ambient temperature (i.e., internal temperature of the storage device), a last-used timestamp (e.g., to determine when a particular head was last used for writing), a next use timestamp (e.g., to calculate an amount of time before a next write operation for a specific head), an inactive duration corresponding to a duration between a last write event and a next write event for a particular head, and/or any other applicable parameters that may affect a head's heater power. As an example, if the inactive duration for head A<head B<head C, then a shorter look-ahead duration and/or a lower heater power can be utilized for head A, as illustrated in FIG. 5. It should be noted that the illustrations depicted in FIG. 5 are exemplary only and are not intended to limit the scope and/or spirit of the present disclosure.

Figure 6A:
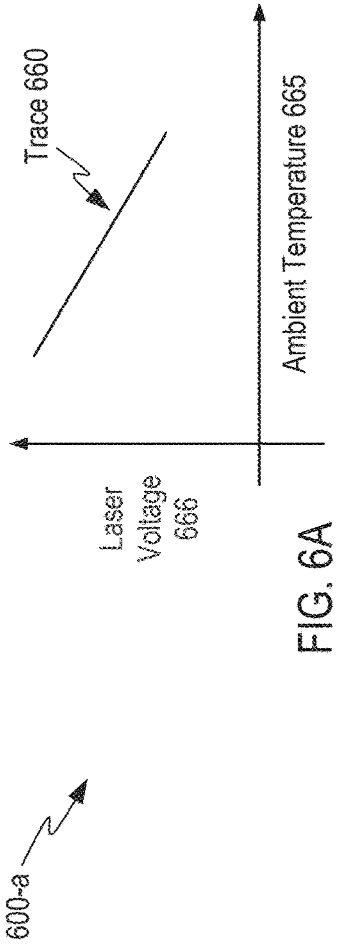
FIG. 6A illustrates a conceptual graph showing a heater diode equation for a HAMR drive, according to various aspects of this disclosure.

FIG. 6A depicts a graph 600-*a* showing an example of a heater diode equation (trace 660), according to various aspects of the disclosure. Graph 600-*a* comprises a trace 660, where trace 660 corresponds to the relationship between laser voltage 666 and ambient temperature 665 when in the write mode phase. In some cases, the trace 660 can be used to determine an optimum laser voltage (LV) for a particular ambient temperature (e.g., ambient temperature measured inside the drive enclosure) when in the write mode phase, further described below in relation to FIGS. 8A-9B.

Figure 6B:
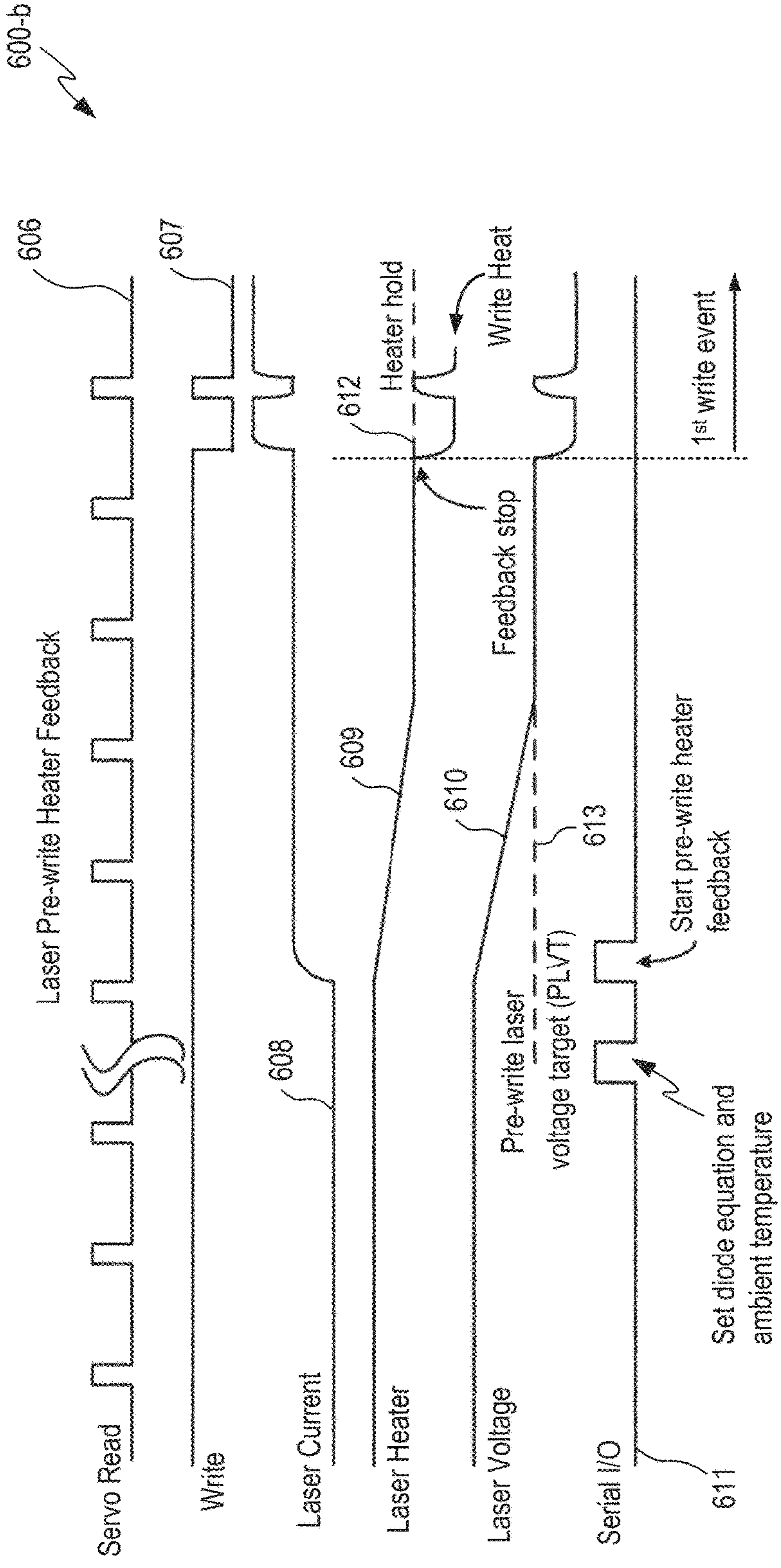
FIG. 6B illustrates a timing diagram for a pre-write feedback phase for a HAMR drive, according to various aspects of this disclosure.

FIG. 6B depicts an embodiment (600-*b*) showing the pre-write feedback phase (e.g., pre-write feedback phase 402), according to various aspects of the disclosure. Specifically, but without limitation, FIG. 6B shows the timing diagrams for a plurality of signals/traces when the laser compensation phase comprises the pre-write feedback phase. In this example, timing diagrams are shown for a servo read signal (trace 606), data write signal (trace 607), laser current signal (trace 608), laser heater signal (trace 609), laser voltage signal (trace 610), and a serial I/O signal (trace 611). In some examples, the laser heater signal (trace 609) may correspond to the heater output power. Additionally, the serial I/O signal may correspond to the serial data transmitted from the SoC 101 to the AE 102 using flex cable 140-*a*.

In some embodiments, the control circuitry 22 (or another module/element of the HAMR drive) is configured to predetermine the heater diode equation for a particular read/write head (or alternatively, for a plurality of read/write heads). In some cases, the heater diode equation for each read/write head may be determined during the manufacturing phase and the data related to the heater diode equation may be loaded and stored on the disk drive, which allows the control circuitry 22 to determine the optimum laser voltage (LV) for a particular ambient temperature. As noted above, the ambient temperature may correspond to the internal temperature of the data storage device, for instance, the temperature measured inside the enclosure of the data storage device.

In some embodiments, the preamp 104 of the HAMR drive 100 is configured to adjust the heater on a read/write head to match the pre-write laser voltage target (PLVT) value 613, where PLVT 613 may be determined based on the ambient temperature and the heater diode equation for that heater. In some examples, the HAMR drive may utilize a pre-write heater control feedback loop during the pre-write phase, further described below in relation to FIGS. 9A-B. Additionally, the pre-write feedback phase may end at or before the start of the write phase, as depicted in FIG. 6B. For example, FIG. 6B shows that the pre-write heater feedback phase ends just before the start of the first write event phase. FIG. 6B also shows an example of the relation between the heat output from the laser heater (shown by trace 609) and the heater hold value 612 during the $1^{st}$ write event. Specifically, but without limitation, FIG. 6B shows how the trace 609 for the laser heater varies in comparison to the heater hold value 612 during the write event.

Figure 7:
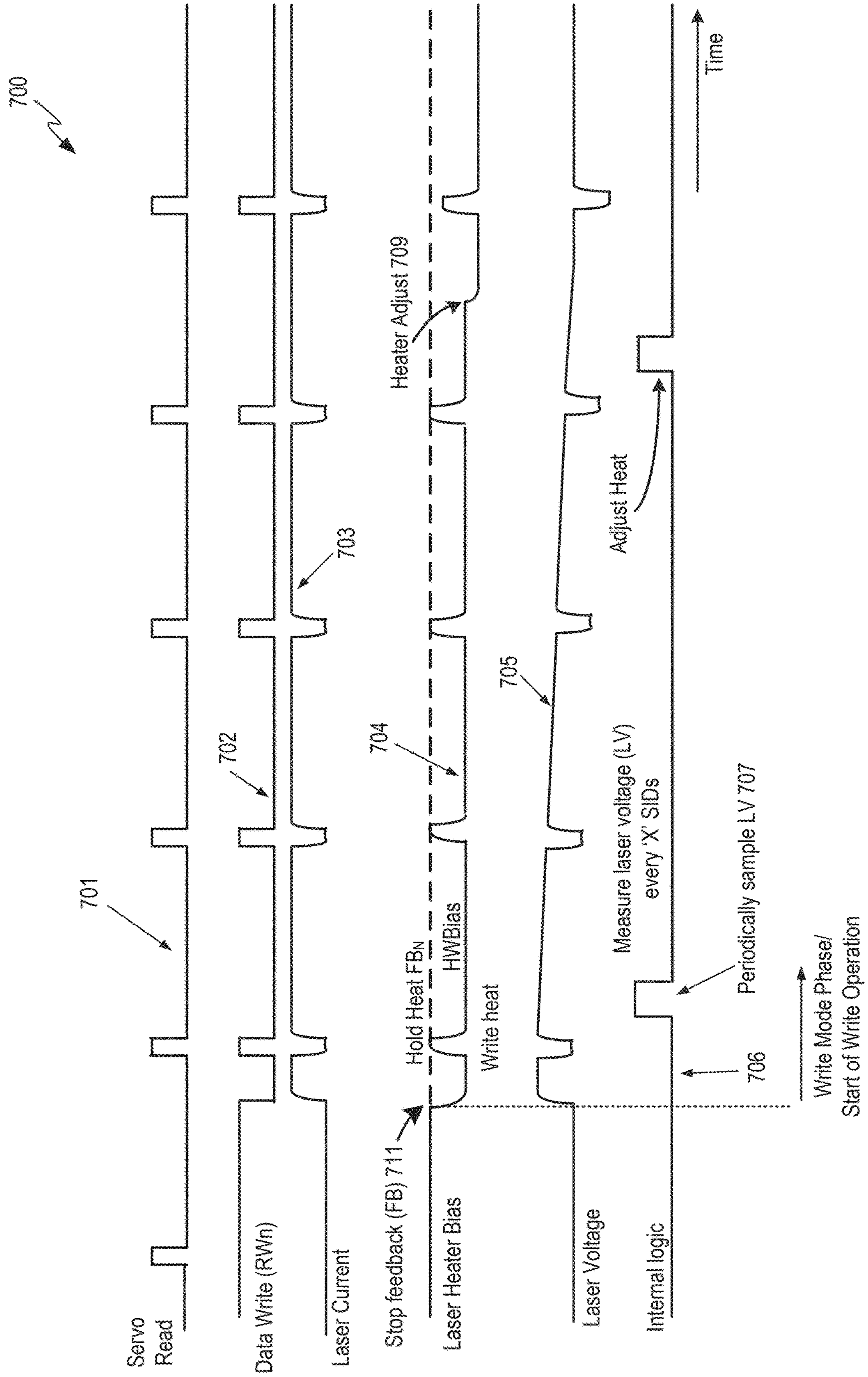
FIG. 7 illustrates a timing diagram showing temperature compensation during a write mode phase for a HAMR drive, according to various aspects of this disclosure.

FIG. 7 depicts timing diagrams (700) corresponding to a write mode phase for a HAMR drive, according to various aspects of the disclosure. As noted above, aspects of the present disclosure may support mode hop and/or temperature compensation during the write mode phase. In some cases, the heater (e.g., heater 330 in FIG. 3) may be utilized to adjust for change in laser temperature. FIG. 7 shows the timing diagrams for a plurality of signals/traces, including a servo read signal (trace 701), data write signal (trace 702), laser current signal (trace 703), laser heater signal (trace 704), laser voltage signal (trace 705), and internal logic signal (trace 706).

In this example, the timing diagrams 700 show a trace 704 corresponding to the laser heater voltage/bias against time, in accordance with one or more implementations. The control circuitry 22 may be configured to stop the laser heater feedback (FB) 711 at or before the start of the write operation. In some examples, the laser heater feedback (711) may correspond to the pre-write heater feedback previously described with reference to FIG. 6B. Furthermore, the internal preamp logic may be configured to periodically sample (707) the laser voltage (LV) every ‘X’ number of SIDs, for instance, once every 20 SIDs, 50 SIDs, etc. Additionally, the control circuitry 22 may be configured to adjust the heat output from the laser heater based on estimating the laser temperature using the measured LV. In some examples, the heater control signal 335 input to heater driver 333-*b* is used to generate and control the heater bias ($V_h$) sent to the heater 330. In this way, the heater control signal 335, heater driver 333-*b*, and heater 330 can be used to independently control the heater output power, and thereby the laser or LD temperature. For example, FIG. 7 shows the laser voltage (trace 705) dropping, which corresponds to an increase in the laser's temperature. In such cases, the laser heater 330 can be adjusted (709) to compensate for the change in laser temperature. For example, the laser heater 330 can be adjusted down (i.e., heat output from the laser heater is decreased by varying the heater control signal 335 input to the heater driver 333-*b*) as the laser temperature rises, which helps reverse the rise in the laser's temperature, as well as keep the LD temperature away from mode hop boundaries (shown as mode hop boundaries 899 in FIG. 8B). In this way, the laser heater 330 (also shown as heater 157 in FIGS. 1B-C) can be controlled to adjust for changes in LD or laser temperature, which can help HAMR drive performance.

Figure 8A:
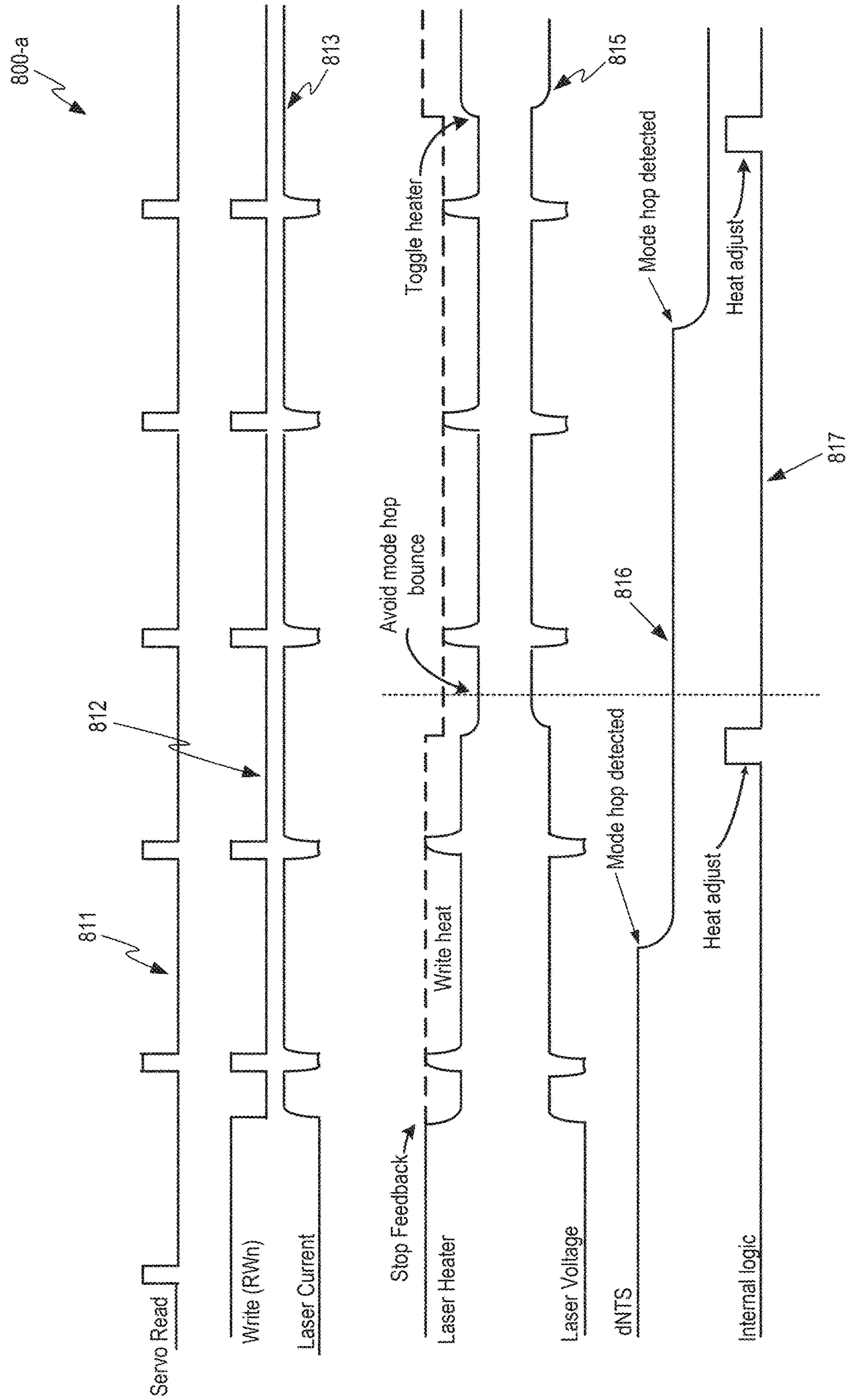
FIG. 8A illustrates a timing diagram showing mode hop compensation during a write mode phase for a HAMR drive, according to various aspects of this disclosure.

FIG. 8A depicts another embodiment (800-*a*) showing various timing diagrams for the write mode phase, according to various aspects of the disclosure. As noted above, the write mode phase may include mode hop and/or temperature compensation. In some cases, the heater (e.g., heater 330 in FIG. 3) may be utilized to reduce or avoid mode hop bounces, where mode hops may be detected based on a differential signal measurement (e.g., a dNTS measurement corresponding to a difference between the NTS measurement and the ECS measurement). FIG. 8A shows the timing diagrams for a plurality of signal measurements/traces, including a servo read signal (trace 811), data write signal (trace 812), laser current signal/measurement (trace 813), laser heater bias signal (trace 814), laser voltage/bias (trace 815), dNTS measurement (trace 816), and internal logic signal (trace 817). In some embodiments, the laser voltage (LV) 815 may or may not be sampled ever ‘X’ number of SIDs, as in FIG. 7.

In some instances, dNTS measurements may facilitate detection of one or more mode hops, as shown on trace 816. In such cases, the internal preamp logic may be configured to respond to these mode hop detections by adjusting the heat output from the laser heater (i.e., increasing or decreasing heater output power), which can help avoid one or more mode hop bounces. For instance, FIG. 8A illustrates a mode hop detection using the dNTS measurements, followed by the internal preamp logic performing a heat adjustment of the laser heater, which helps avoid the mode hop bounce. In this way, the dNTS measurements can be used in conjunction with the internal preamp logic to toggle the heater upon detecting a mode hop, thereby avoiding mode hop bounces and enhancing HAMR drive performance. Furthermore, the independent control of the heater during the write phase can enable the laser heater to adjust/move the laser temperature away from a mode hop boundary, which can also help enhance HAMR drive performance, as compared to the prior art.

Figure 8B:
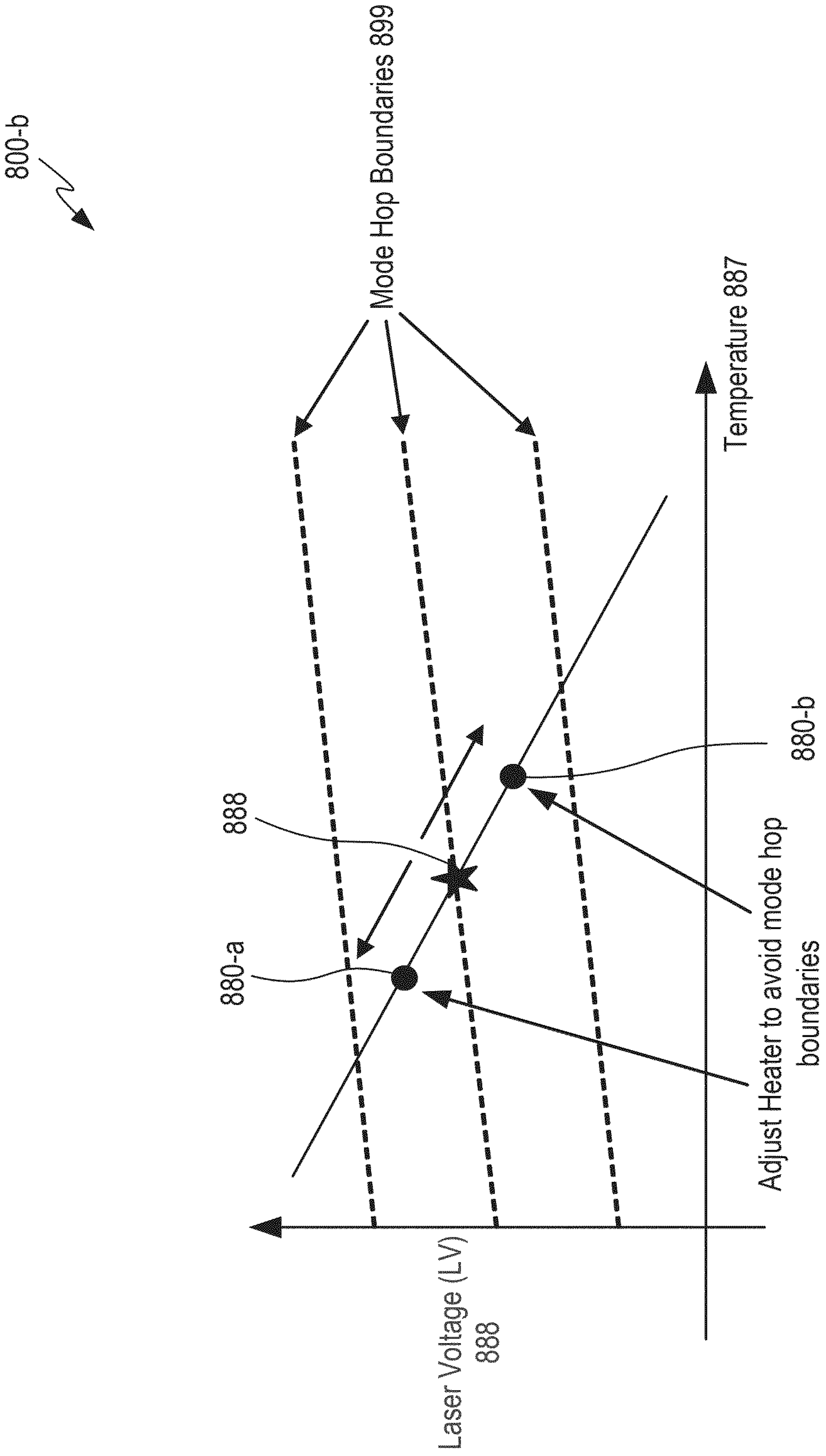
FIG. 8B illustrates a conceptual graph showing laser voltage against temperature, where the graph depicts a plurality of mode hop boundaries and heater adjustment to avoid the mode hop boundaries, according to various aspects of this disclosure.

Turning now to FIG. 8B, which depicts a graph 800-*b* showing laser voltage 888 against temperature 887 for a LD, according to various aspects of the present disclosure. In some embodiments, the preamp (or control circuitry 22) is configured to toggle the laser heater up or down for each mode hop event. In some aspects, controlling the laser heater during the write mode phase enables the laser heater to adjust the laser temperature so as to avoid mode hop boundaries (899). For example, when a mode hop event is detected (888), the heat output from the laser heater can be adjusted (e.g., up, or down) to move the laser temperature away from the middle mode hop boundary. In one non-limiting example, mode hop compensation can comprise reducing the heating power (880-*a*) of the laser heater. Alternatively, mode hop compensation can comprise increasing the heating power (880-*b*) of the laser heater.

Figure 9A:
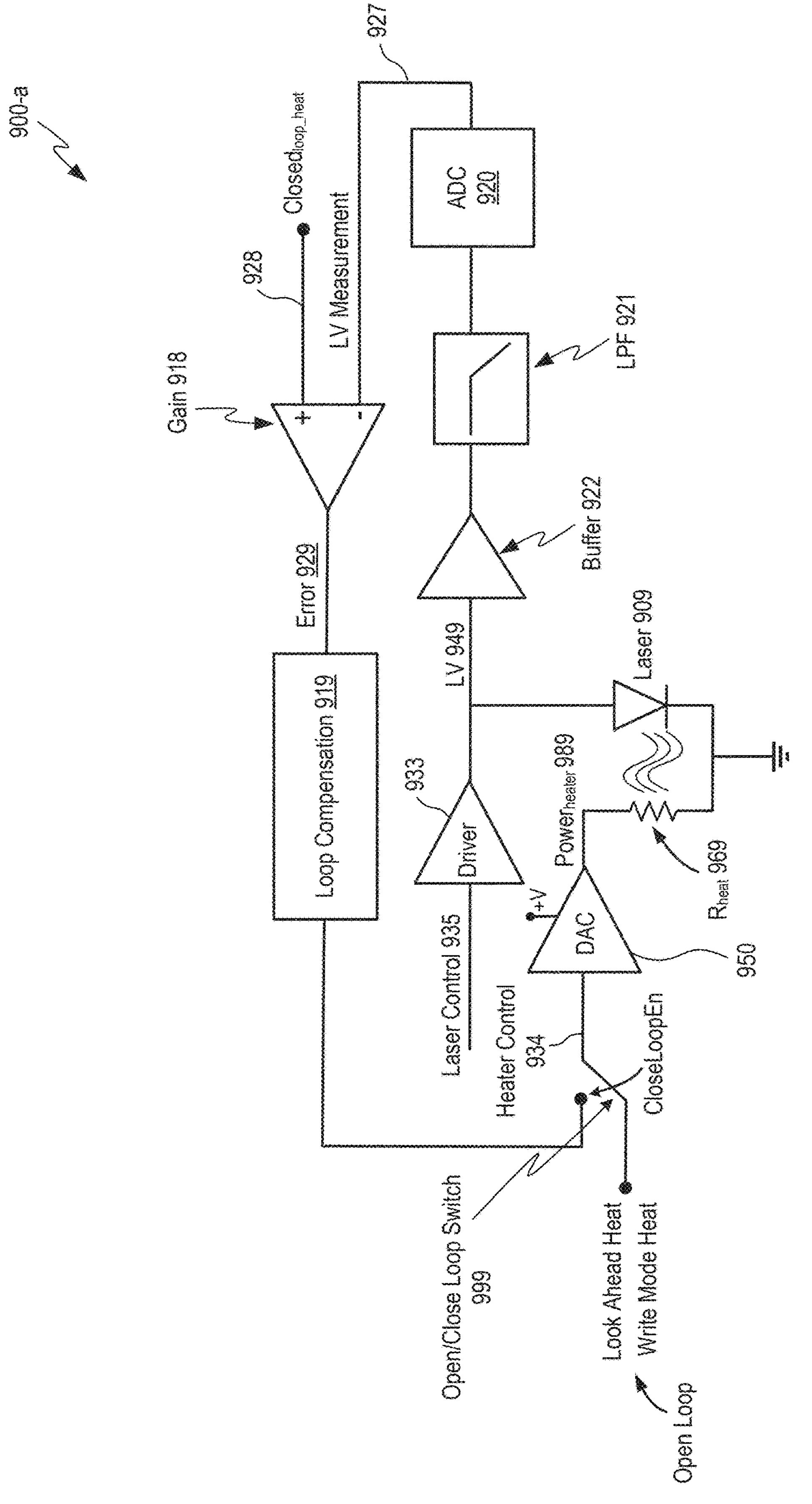
FIG. 9A illustrates a schematic diagram of a control feedback architecture for a laser heater driver of a HAMR drive, according to various aspects of this disclosure.

FIG. 9A depicts an example of a control feedback loop 900-*a* for a laser heater driver 950, where the control feedback loop can be employed during one or more laser compensation phases (e.g., look-ahead phase, pre-write feedback phase, write mode phase) of a disk drive operation, according to various aspects of the present disclosure. In some cases, an open/close loop switch 999 can be toggled to switch the control feedback loop 900-*a* between open loop (OL) control (e.g., used for look-ahead and/or write mode phases) or closed loop (CL) control (e.g., used during pre-write feedback phase). In some instances, the CL phase is used to set the heater value (e.g., temperature of resistive heater 969) to a target value, based on the estimated LD temperature. Since the laser voltage is susceptible to drastic changes at the start of the write operation, OL control may be used during the write mode phase, since CL control may result in high, erroneous values for the error 929. To circumvent this issue, in some embodiments, the target LV value for use in the pre-write feedback phase may be determined during the manufacturing stage of the HAMR drive. Additionally, the target LV value for the pre-write feedback phase may be used to determine the optimum laser power for the write mode phase. In such cases, once in write mode phase, the heater adjustments can be based on feedback from the mode hop detection and/or temperature measurements, described in relation to FIGS. 6A through 9B.

As seen, the control feedback loop 900-*a* further comprises a laser 909 (or LD 909), a resistive heater 969 (or $R_{heat}$ 969), a laser diode drive 933, a heater driver 950, a buffer 922, a low pass filter (LPF) 921, an analog-to-digital converter (ADC) 920, a comparator having a gain 918, and a loop compensator 919 (or loop compensation module 919). Here, the laser control signal 935 is input to the LD driver 933 to adjust the LV value 949 used to bias the laser 909. Additionally, the heater control signal 934 is input to the heater driver 950 (which may include a digital-to-analog or DAC converter) to adjust an amount of heater output power ($Power_{heater}$ 989) from the laser heater (e.g., $R_{heat}$ 969). The 'wavy-lines' between $R_{heat}$ 969 and the laser 909 are intended to depict the temperature adjustment of the laser or LD 909 using the laser heater. As previously described in relation to FIG. 3, the laser 909 and the laser heater 969 are independently controlled through the use of separate drivers (i.e., laser driver 933, heater driver 950).

In some examples, measurements of the LV values 949 are passed through the buffer 922, LPF 921, and ADC 920 to generate an LV measurement 927 that can be input into the comparator. The comparator has a gain 918 and is also configured to receive a $Closed_{loop\_heat}$ value 928, where the $Closed_{loop\_heat}$ value is calculated using a heater diode equation, described below in relation to FIG. 9B. The comparator outputs an error (if any) based on comparing its inputs 927, 928 (e.g., calculating a difference between the LV measurement 927 and the $Closed_{loop\_heat}$ value 928). The error value 929 is then passed through the loop compensator 919 for feedback compensation. In some examples, if CL control is engaged/enabled, the output from the loop compensation 919 may serve as (or may be used to determine) the heater control 934.

In some other cases, if the open/close loop switch 999 is disengaged (i.e., OL control is enabled, shown by the switch position in FIG. 9A), the heater control 934 may be based on the compensation phase (e.g., look-ahead phase, or write mode phase). As shown, the control loop 900-*a* can utilize a pre-determined Look Ahead Heat value for the LA compensation phase. Similarly, the control loop 900-*a* can utilize a pre-determined Write Mode Heat value for the write mode compensation phase and when OL control is enabled for the write mode phase.

Figure 9B:
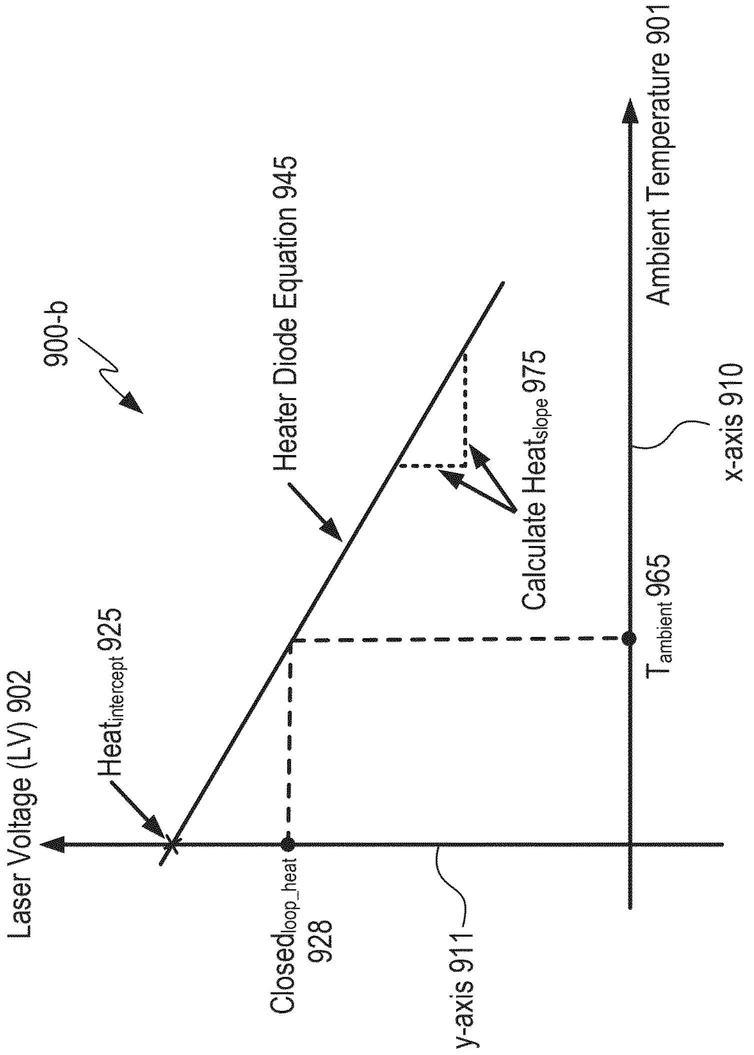
FIG. 9B illustrates a conceptual graph showing laser voltage against ambient temperature, as well as a trace of the heater diode equation, according to various aspects of this disclosure.

FIG. 9B depicts another example of a graph 900-*b* showing a heater diode equation 945, according to various aspects of the present disclosure. Here, laser voltage (LV) values 902 are shown along the y-axis 911 and ambient temperature 901 (e.g., temperature in the HAMR drive enclosure) is shown along the x-axis 910. As seen in FIG. 9B, the graph 900-*b* shows the heater diode equation 945, including the y-axis 911 intercept (shown as $Heat_{intercept}$ 925), the calculated slope ($Heat_{slope}$ 975), and the laser voltage value ($Closed_{loop\_heat}$ 928) when the ambient temperature is $T_{ambient}$ 965. This allows calculation of the $Closed_{loop\_heat}$ value 928 for any ambient temperature, as described below. In some aspects, the $Closed_{loop\_heat}$ value 928 may correspond to an optimum LV value in the write mode. Thus, as described above in FIG. 9A, comparing the LV measurement 927 and the $Closed_{loop\_heat}$ value 928 can be used to determine an error 929 between the measured/monitored LV value and the optimal LV value for a specific ambient temperature. Next, the error 929 is used to calculate a heat compensation value (or temperature adjustment value), which can then be used to generate the heater control signal 934 to adjust the heater output and thereby help reduce or minimize the error 929.

In some embodiments, an OL control scheme is utilized during the look ahead and write modes, while a CL control scheme is utilized during the pre-write mode. In some cases, in closed loop mode, the FW is configured to load one or more of $T_{ambient}$ 965, $Heat_{slope}$ 975, and $Heat_{intercept}$ 925 into the preamp (e.g., preamp 104). Furthermore, the $Closed_{loop\_heat}$ value 928 is calculated, in example embodiments, from a heater diode equations as follows: $Closed_{loop\_heat}=T_{ambient}*Heat_{slope}+Heat_{intercept}$. In some embodiments, the laser voltage (LV) measurement 927 (measured as an analog signal) is passed through a buffer 922 and a low pass filter (LPF) 921 before it is measured by the ADC 920. The measured LV 927 is then compared to the $Closed_{loop\_heat}$ value 928 to determine the error 929. The heater control DAC 950 then adjusts the laser heater power (shown as $Power_{heater}$ 989 in FIG. 9A) to reduce the error between the measured value of LV and the value of $Closed_{loop\_heat}$.

As noted above, an OL control scheme can be utilized during the look ahead and write phases (or modes). In such cases, when the feedback is off (i.e., CloseLoopEn is not set in FIG. 9A), the 'Look Ahead Heat' and 'Write Mode Heat' values are utilized for the look-ahead and write modes, respectively. In some embodiments, the 'Look Ahead Heat' and 'Write Mode Heat' values may be determined during the manufacturing phase of the HAMR drive and may be loaded onto the preamp for use during OL control.

Any suitable control circuitry (e.g., control circuitry 22 in FIG. 2A) may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or SoC (e.g., SoC 101 in FIG. 1B). In addition, control circuitry 22 may include a preamp circuit implemented as a separate integrated circuit, integrated into the read channel or data storage controller circuit, or integrated into the SoC 101.

In some examples, the control circuitry, such as, but not limited to, control circuitry 22, comprises a microprocessor executing instructions, the instructions being operable to cause the microprocessor to perform any of the process flows and/or methods described herein. The instructions may be stored in any computer-readable medium. In some examples, they may be stored on a non-volatile semiconductor memory device, component, or system external to the microprocessor, or integrated with the microprocessor in the SoC 101. In some examples, the instructions are stored on the disk and read into a volatile semiconductor memory when the disk drive is powered on. In some examples, the control circuitry 22 comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute control circuitry 22 as described herein and may perform one or more of the functions of control circuitry 22 as described herein. In various examples, control circuitry 22, or another processing device performing one or more of the functions of control circuitry as described herein, may be abstracted away from being physically proximate to the disks and disk surfaces. The control circuitry, or another processing device performing one or more of the functions of control circuitry as described herein, may be part of or proximate to a rack of or a unitary product comprising multiple data storage devices, may be part of or proximate to one or more physical or virtual servers, may be part of or proximate to one or more local area networks or one or more storage area networks, may be part of or proximate to a data center, or may be hosted in one or more cloud services.

In various examples, a disk drive, such as disk drive 15, may include a magnetic disk drive (e.g., employing heat assisted magnetic recording or HAMR), an optical disk drive, a hybrid disk drive, or other types of disk drives. In addition, some examples may include electronic devices such as computing devices, data server devices, media content storage devices, or other devices, components, or systems that may comprise the storage media and/or control circuitry described above.

The various features and processes described above may be used independently of one another or may be combined in various ways. All possible combinations and sub combinations are intended to fall within the scope of this disclosure. In addition, certain method, event, or process blocks may be omitted in some implementations. The methods and processes described herein are not limited to any particular sequence, and the blocks or states relating thereto can be performed in other sequences. For example, tasks or events may be performed in an order other than that specifically disclosed, or multiple tasks or events may be combined in a single block or state. The tasks or events may be performed in serial, in parallel, or in another manner. Tasks or events may be added to or removed from the disclosed examples. The systems and components described herein may be configured differently than described. For example, elements may be added to, removed from, or rearranged compared to the disclosed examples.

While certain embodiments are described herein, these embodiments are presented by way of example only, and do not limit the scope of this disclosure. Nothing in the foregoing description implies that any particular feature, characteristic, step, module, or block is necessary or indispensable. The novel methods and systems described herein may be embodied in a variety of other forms. Various omissions, substitutions, and changes in the form of the methods and systems described herein may be made without departing from the spirit and scope of this disclosure.

Any of the method(s) described herein may include other steps or variations in various other embodiments. Some or all of the method(s) described herein may be performed by or embodied in hardware, or performed or executed by a controller, a CPU, a field-programmable gate array (FPGA), a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for laser heater feedback control in a data storage device configured for HAMR. Those of skill in the art will be well-equipped by this disclosure with an understanding and an informed reduction to practice of a wide panoply of further applications, architectures, techniques, and methods for laser heater feedback control in a HAMR drive, and other aspects of this disclosure encompassed by the present disclosure and by the claims set forth below.

As used herein, the recitation of "at least one of A, B and C" is intended to mean "either A, B, C or any combination of A, B and C." The disclosed examples are provided to enable any person skilled in the relevant fields of art to understand how to make or use the subject matter of this disclosure. Various modifications to these embodiments will be readily apparent to those skilled in the art based on this disclosure, and the generic principles defined herein may be applied to other examples without departing from the spirit or scope of this disclosure. Thus, this disclosure is not limited to the embodiments shown herein but is to be accorded the widest scope consistent with the principles and novel features disclosed herein.

This disclosure and many of its attendant advantages will be understood by the foregoing description, and various changes may be made in the form, construction, and arrangement of the components without departing from the disclosed subject matter or without sacrificing its material advantages. The form described is merely explanatory, and the following claims encompass and include a wide range of embodiments, including a wide range of changes in the form, construction, and arrangement of components as described herein.

While this disclosure has been described with reference to various examples, these examples are illustrative, and the scope of the disclosure is not so limited. The subject matter described herein is presented in the form of illustrative, non-limiting examples, and not as exclusive implementations, whether or not they are explicitly called out as examples as described. Many variations, modifications, and additions are possible within the scope of the examples of the disclosure. More generally, examples in accordance with this disclosure have been described in the context of particular implementations. Functionality may be separated or combined in blocks differently or described with different terminology, without departing from the spirit and scope of this disclosure and the following claims. These and other variations, modifications, additions, and improvements may fall within the scope of this disclosure as defined in the following claims.

The invention claimed is:

1. A data storage device configured for heat assisted magnetic recording (HAMR) comprising:
- one or more disks;
- one or more read/write heads configured to read data from and write data to the one or more disks;
- one or more laser modules, each laser module comprising:
  - a laser diode (LD) configured to heat an area of one of the one or more disks near one of the one or more read/write heads; and
  - a heater configured to heat the LD;
- an LD driver;
- a heater driver; and
- one or more processing devices configured, individually or in combination, to independently control the LD driver and the heater driver for a plurality of compensation phases, wherein the plurality of compensation phases comprises a look-ahead phase, a pre-write feedback phase, and a write mode phase, wherein independently controlling the LD driver and the heater driver comprises:
  - determining a target laser voltage (LV) value for a first LD of a first laser module;
  - driving, using the LD driver, the first LD of the first laser module, based on the target LV value;
  - determining a temperature adjustment value for the first LD; and
  - driving, using the heater driver, a first heater to adjust one or more of a LV value and a temperature of the first LD, based on the temperature adjustment value.

2. The data storage device of claim 1, wherein the one or read/write heads comprise a plurality of read/write heads, and wherein the one or more laser modules comprise a plurality of laser modules, including at least the first laser module.

3. The data storage device of claim 1, wherein the one or more processing devices are further configured, individually or in combination, to:
- identify a compensation phase from the plurality of compensation phases; and
- select a control loop scheme, based on the identified compensation phase.

4. The data storage device of claim 3, wherein the control loop scheme comprises one of open loop (OL) control or closed loop (CL) control.

5. The data storage device of claim 4, wherein the one or more processing devices are further configured, individually or in combination, to:
- select a first set of laser modules, wherein the first set of laser modules includes at least the first laser module, and wherein the first set of laser modules is associated with a first set of read/write heads; and
- assign each read/write head from the first set of read/write heads to a preamp of a plurality of preamps.

6. The data storage device of claim 5, wherein the one or more processing devices are further configured, individually or in combination, to:
- determine, for each laser module from the first set of laser modules, one or more of:
  - a heater output power for a respective heater during the look-ahead phase; and
  - a corresponding duration for the look-ahead phase.

7. The data storage device of claim 6, wherein a respective heater output power during a look-ahead phase is linked to a corresponding duration of the look-ahead phase and vice-versa.

8. The data storage device of claim 7, wherein the one or more processing devices are further configured, individually or in combination to:
- toggle a switch to enable OL control during the look-ahead phase, wherein OL control during the look-ahead phase comprises:
  - obtaining a pre-determined Look Ahead Heat value for generating a heater control signal;
  - supplying the heater control signal to the heater driver; and
  - wherein driving the one or more heaters, including at least the first heater, using the heater driver is based at least on the heater control signal associated with the pre-determined Look Ahead Heat Value.

9. The data storage device of claim 6, wherein the one or more processing devices are further configured, individually or in combination, to:
- determine a number of sector identifications (SIDs) for the pre-write feedback phase; and
- determine a number of data blocks for the write mode phase.

10. The data storage device of claim 9, wherein determining the heater output power for the one or more heaters, including at least the first heater, is based at least in part on determining one or more of:
- an ambient temperature;
- a pre-write laser voltage (PLVT) target value; and
- a temperature adjustment value of a corresponding LD.

11. The data storage device of claim 10, wherein:
- the PLVT target value corresponds to the target LV value to be maintained between an end of the look-ahead phase and a start of the write mode phase,
- the PLVT target value is determined based on a heater diode equation and an ambient temperature, and
- the heater diode equation is used to determine an optimal LV value for a particular ambient temperature.

12. The data storage device of claim 11, wherein the control scheme comprises CL control when the compensation phase comprises the pre-write feedback phase, and wherein the one or more processing devices are further configured, individually or in combination, to:

monitor a laser voltage (LV) value at the LDs of the one or more laser modules, including at least the first LD of the first laser module;

determine at least one LV error, based on comparing the PLVT target value to a corresponding LV value; and adjust a temperature of the corresponding LD to minimize or reduce the at least one LV error.

13. The data storage device of claim 12, wherein adjusting the temperature of the corresponding LD during the pre-write feedback phase comprises:

determining a heater bias for minimizing or reducing the at least one LV error; and controlling a heater output power for the respective heater, based on applying the heater bias to the respective heater.

14. The data storage device of claim 13, wherein the one or more processing devices are configured to, individually or in combination, one or more of:

end the pre-write feedback phase at or before a start of the write mode phase, wherein the write mode phase includes at least a first data write operation; and determine a plurality of mode hop boundaries to be avoided during the write mode phase, based on identifying a relationship between LD temperatures and LV values.

15. The data storage device of claim 14, wherein the write mode phase comprises one or more of mode compensation and LD temperature compensation, and wherein the one or more processing devices are configured, individually or in combination, to:

detect mode hops based on a differential signal measurement (dNTS measurement), wherein the dNTS measurement corresponds to a difference between a near-field transducer temperature sensor (NTS) measurement and an embedded contact sensor (ECS) measurement; and adjust a heat output power from the first heater to shift the LD temperature away from the plurality of mode hop boundaries.

16. The data storage device of claim 14, wherein the one or more processing devices are configured, individually or in combination, to:

obtain a plurality of LV values at the first LD for a plurality of ambient temperature values;

calculate a heat slope value ($Heat_{slope}$) and a heat intercept value ($Heat_{intercept}$), based on obtaining the plurality of LV values for the plurality of ambient temperature values; and determine a heater diode equation for CL feedback for the heater driver when the compensation phase comprises the write mode phase, wherein the heater diode equation is used to calculate an optimum LV value ($Closed_{loop\_heat}$) for a specific ambient temperature ($T_{ambient}$); and wherein the heater diode equation is:

$$Closed_{loop\_heat} = T_{ambient} * Heat_{slope} + Heat_{intercept}.$$

17. The data storage device of claim 16, wherein, the one or more processing devices are configured, individually or in combination, to:

determine an LV error for the first LD, based at least in part on comparing the optimum LV value ($Closed_{loop\_heat}$) to a measured LV value for the first LD;

pass the LV error through a loop compensator to generate a heater control signal; and adjust a heater output power from the first heater to reduce or minimize the LV error for the first LD, based on the heater control signal.

18. A method for operating a data storage device configured for heat assisted magnetic recording (HAMR), the method comprising:

determining a target laser voltage (LV) value for a first laser diode (LD) of a first laser module of the data storage device, wherein the data storage device comprises:

one or more read/write heads configured to read data from and write data to the data storage device;

an LD driver;

a heater driver; and one or more laser modules, each laser module comprising:

an LD configured to heat an area of the data storage device near one of the one or more read/write heads; and a heater configured to heat the LD;

independently controlling the LD driver and the heater driver for a plurality of compensation phases, wherein the plurality of compensation phases comprises a look-ahead phase, a pre-write feedback phase, and a write mode phase, wherein independently controlling the LD driver and the heater driver comprises:

driving, using the LD driver, the first LD of the first laser module, based on the target LV value;

determining a temperature adjustment value for the first LD; and driving, using the heater driver, a first heater to adjust one or more of a LV value and a temperature of the first LD, based on the temperature adjustment value.

19. One or more processing devices configured, individually or in combination, with:

means for determining a target laser voltage (LV) value for a first laser diode (LD) of a first laser module of a data storage device, wherein the data storage device comprises:

one or more read/write heads configured to read data from and write data to the data storage device; and one or more laser modules, each laser module comprising:

an LD configured to heat an area of the data storage device near one of the one or more read/write heads; and a heater configured to heat the LD;

wherein the one or more processing devices are configured, individually or in combination, to independently control an LD driver and a heater driver for a plurality of compensation phases, wherein the plurality of compensation phases comprises a look-ahead phase, a pre-write feedback phase, and a write mode phase;

means for driving the first LD of the first laser module, based on the target LV value;

means for determining a temperature adjustment value for the first LD; and means for driving a first heater to adjust one or more of a LV value and a temperature of the first LD, based on the temperature adjustment value.

* * * * *